United States Patent
Ishitani et al.

(10) Patent No.: US 9,952,725 B2
(45) Date of Patent: Apr. 24, 2018

(54) LIQUID CRYSTAL DISPLAY DEVICE AND ELECTRONIC DEVICE HAVING SENSOR CIRCUIT COMPRISING A TRANSISTOR AND A CAPACITOR

(71) Applicant: SEMICONDUCTOR ENERGY LABORATORY CO., LTD., Atsugi-shi, Kanagawa-ken (JP)

(72) Inventors: Tetsuji Ishitani, Kanagawa (JP); Ryo Hatsumi, Kanagawa (JP); Koji Kusunoki, Kanagawa (JP); Hiroyuki Miyake, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/692,297

(22) Filed: Apr. 21, 2015

(65) Prior Publication Data
US 2015/0301382 A1 Oct. 22, 2015

(30) Foreign Application Priority Data
Apr. 22, 2014 (JP) .................. 2014-088324

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0412* (2013.01); *G09G 3/3618* (2013.01); *G09G 2340/0435* (2013.01)

(58) Field of Classification Search
CPC combination set(s) only.
See application file for complete search history.

(56) References Cited

U.S. PATENT DOCUMENTS

| 6,842,211 B2 | 1/2005 | Katsura |
| 6,844,910 B2 | 1/2005 | Katsura |

(Continued)

FOREIGN PATENT DOCUMENTS

| JP | 2003-196023 | 7/2003 |
| JP | 2009-003916 A | 1/2009 |

(Continued)

OTHER PUBLICATIONS

Watanabe et al., U.S. Appl. No. 14/639,336, filed Mar. 5, 2015.
Miyake et al., U.S. Appl. No. 14/684,661, filed Apr. 13, 2015.

*Primary Examiner* — Lauren Nguyen
(74) *Attorney, Agent, or Firm* — Nixon Peabody LLP; Jeffrey L. Costellia

(57) ABSTRACT

A novel liquid crystal display device (LCD) including a touch sensor. The LCD includes a first substrate and a second substrate, which face each other, and a liquid crystal layer. The first substrate is provided with a pixel electrode. The second substrate is provided with a first electrode, a second electrode, and an insulating layer. The pixel electrode overlaps with the first electrode with the liquid crystal layer interposed therebetween. The second electrode overlaps with the first electrode with the insulating layer interposed therebetween. The LCD generates a signal corresponding to a potential of the second electrode. This structure enables a thin and lightweight LCD.

10 Claims, 10 Drawing Sheets

(51) Int. Cl.
*G09G 3/36* (2006.01)
*G09G 5/42* (2006.01)

(56) References Cited

U.S. PATENT DOCUMENTS

| | | |
|---|---|---|
| 7,674,650 B2 | 3/2010 | Akimoto et al. |
| 7,679,710 B2 | 3/2010 | Katsura |
| 7,804,552 B2 | 9/2010 | Yamazaki et al. |
| 8,243,027 B2 | 8/2012 | Hotelling et al. |
| 8,259,078 B2 | 9/2012 | Hotelling et al. |
| 8,432,371 B2 | 4/2013 | Hotelling et al. |
| 8,451,244 B2 | 5/2013 | Hotelling et al. |
| 8,552,989 B2 | 10/2013 | Hotelling et al. |
| 8,648,995 B2 | 2/2014 | Katsura |
| 8,654,083 B2 | 2/2014 | Hotelling et al. |
| 8,704,803 B2 | 4/2014 | Koyama et al. |
| 8,928,644 B2 | 1/2015 | Kurokawa et al. |
| 9,244,561 B2 | 1/2016 | Hotelling et al. |
| 9,268,429 B2 | 2/2016 | Hotelling et al. |
| 2008/0062140 A1* | 3/2008 | Hotelling ............. G09G 3/3648 345/173 |
| 2008/0167526 A1 | 7/2008 | Crank et al. |
| 2013/0207112 A1 | 8/2013 | Isobe et al. |
| 2015/0255518 A1 | 9/2015 | Watanabe et al. |
| 2015/0301422 A1 | 10/2015 | Miyake et al. |
| 2016/0117023 A1 | 4/2016 | Hotelling et al. |

FOREIGN PATENT DOCUMENTS

| | | | |
|---|---|---|---|
| JP | 2009-199093 A | | 9/2009 |
| JP | 2003-196023 | * | 7/2016 ........... G06F 1/1368 |

* cited by examiner

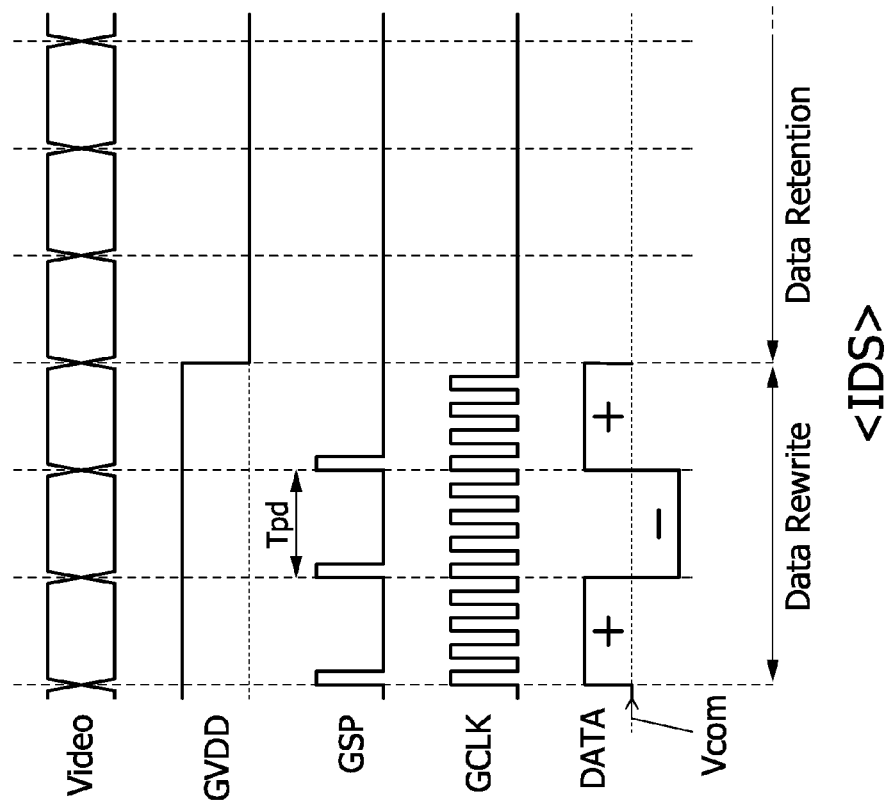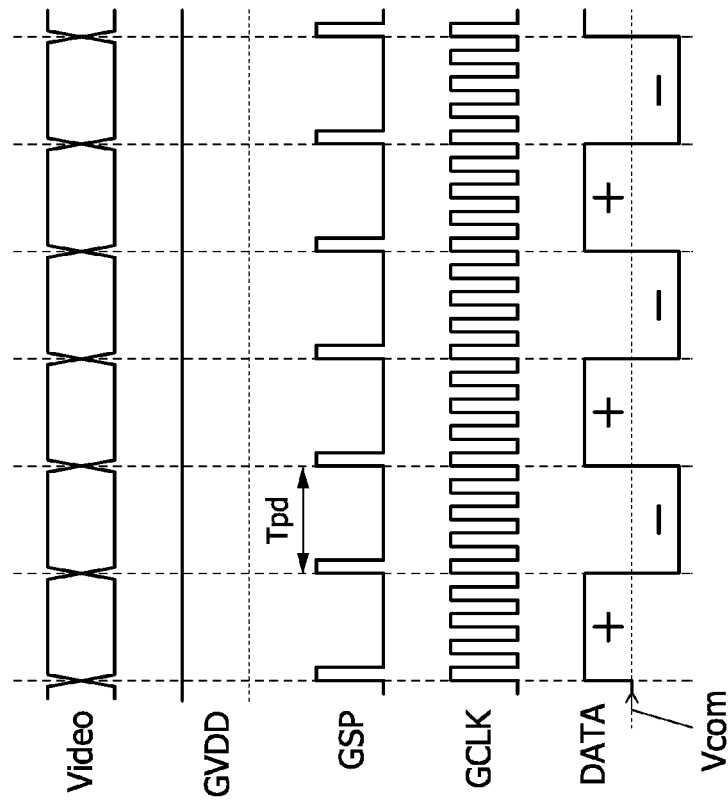

LIQUID CRYSTAL DISPLAY DEVICE AND ELECTRONIC DEVICE HAVING SENSOR CIRCUIT COMPRISING A TRANSISTOR AND A CAPACITOR

BACKGROUND OF THE INVENTION

1. Field of the Invention

One embodiment of the present invention relates to a liquid crystal display device and an electronic device including the liquid crystal display device.

One embodiment of the invention disclosed in the specification, drawings, and claims of the present invention (hereinafter referred to as this specification and the like) is not limited to the above technical field. One embodiment of the present invention relates to an object, a method, or a manufacturing method. One embodiment of the present invention relates to a process, a machine, manufacture, or a composition of matter. As examples of the technical field of one embodiment of the present invention, a device such as a semiconductor device, a display device, a light-emitting device, a lighting device, a power storage device, or a memory device, a method of driving the device, and a method of manufacturing the device are given.

2. Description of the Related Art

A touch sensor is mounted in an information terminal as an input unit instead of a keyboard, for increasing the screen size, reducing the weight, and improving the convenience. Examples of information terminals including a touch sensor are a smartphone, a navigation system, a tablet information terminal, and an e-book reader. These information terminals have a problem in that the thickness is increased by a touch sensor overlapping with a display portion.

To solve this problem, for example, Patent Document 1 describes that a thin display device can be provided by oppositely disposing a substrate provided with a driver circuit for displaying images and a substrate provided with an element for detecting the coordinates.

REFERENCE

Patent Document

[Patent Document 1] Japanese Published Patent Application No. 2003-196023

SUMMARY OF THE INVENTION

An object of one embodiment of the present invention is to provide a novel semiconductor device, a novel display device, a novel liquid crystal display device (LCD), or a method of driving these devices. For example, an object of one embodiment is to reduce the thickness or weight of a display device including a touch sensor.

The description of a plurality of objects does not preclude their coexistence. One embodiment of the present invention does not necessarily achieve all the objects. Objects other than those listed above are apparent from the description of the specification and the like. Such objects could be objects of one embodiment of the present invention.

An embodiment of the present invention in a liquid crystal display device including a first substrate; a second substrate; a liquid crystal layer; a pixel electrode; a first electrode; a second electrode; an insulating layer; and a sensor circuit. In the liquid crystal display device, the first substrate and the second substrate face each other; the liquid crystal layer is provided between the first substrate and the second substrate; the first substrate is provided with the pixel electrode; the second substrate is provided with the first electrode, the second electrode, and the insulating layer; the second substrate is provided with the sensor circuit; the pixel electrode has a region overlapping with the first electrode with the liquid crystal layer interposed therebetween; the second electrode has a region overlapping with the first electrode with the insulating layer interposed therebetween; and the sensor circuit generates a signal corresponding to a potential of the second electrode.

In the above-described embodiment, flexible substrates can be used as the first substrate and the second substrate.

In this specification and the like, ordinal numbers such as first, second, and third are used to avoid confusion among components, and the terms do not limit the components numerically.

In this specification and the like, a semiconductor device refers to a device that utilizes semiconductor characteristics, and means a circuit including a semiconductor element (e.g., a transistor or a diode), a device including the circuit, and the like. The semiconductor device also means any device that can function by utilizing the semiconductor characteristics. For example, an integrated circuit and a chip including an integrated circuit are semiconductor devices. Furthermore, a memory device, a display device, a light-emitting device, a lighting device, an electronic device, and the like themselves are semiconductor devices. These semiconductor devices further include a semiconductor device in some cases.

A transistor has three terminals: a gate, a source, and a drain. The gate functions as a control terminal that controls the conduction state of the transistor. The two terminals other than the gate function as input-output terminals of the transistor. Depending on the conductivity type of the transistor and potentials applied to the three terminals of the transistor, one of the two terminals becomes a source and the other becomes a drain. In general, in an n-channel transistor, a terminal to which a low potential is applied is called a source, and a terminal to which a high potential is applied is called a drain. In contrast, in a p-channel transistor, a terminal to which a low potential is applied is called a drain, and a terminal to which a high potential is applied is called a source. Thus, the two terminals other than the gate switch their functions in accordance with potentials applied to the three terminals of the transistor in some cases. For this reason, in this specification and the like, one of the two terminals, which function as a source and a drain of a transistor, is called a first terminal and the other is called a second terminal in some cases.

In this specification, to clarify a circuit configuration and circuit operation, one of two input-output terminals of a transistor is fixed as a source and the other is fixed as a drain in some cases. It is needless to say that, depending on a driving method, the magnitude relationship between potentials applied to three terminals of the transistor might be changed, and the source and the drain might be interchanged. Thus, in one embodiment of the present invention, the distinction between the source and drain of the transistor is not limited to that described in this specification and the drawings.

An embodiment of the present invention can provide a novel semiconductor device, a novel display device, a novel LCD, a novel method of driving these devices, or the like. For example, one embodiment of the present invention can reduce the thickness or weight of an LCD including a touch sensor.

Note that the description of these effects does not disturb the existence of other effects. One embodiment of the present invention does not necessarily obtain all the effects. Furthermore, one embodiment of the present invention is not limited by these effects. For example, depending on circumstances or conditions, one embodiment of the present invention might not produce these effects or might produce another effect. In one embodiment of the present invention, an object other than the above objects, an effect other than the above effects, and a novel structure will be apparent from the description in the specification and the like.

BRIEF DESCRIPTION OF THE DRAWINGS

FIG. 4A illustrates a sensor circuit and an output circuit; and FIG. 4B illustrates a pixel circuit.

FIG. 5A illustrates a normal driving; and FIG. 5B illustrates an IDS driving.

FIGS. 6A and 6B are schematic views illustrating an example of a method of driving an LCD: FIG. 6A illustrates a normal driving; and FIG. 6B illustrates an IDS driving.

DETAILED DESCRIPTION OF THE INVENTION

Figure 1:
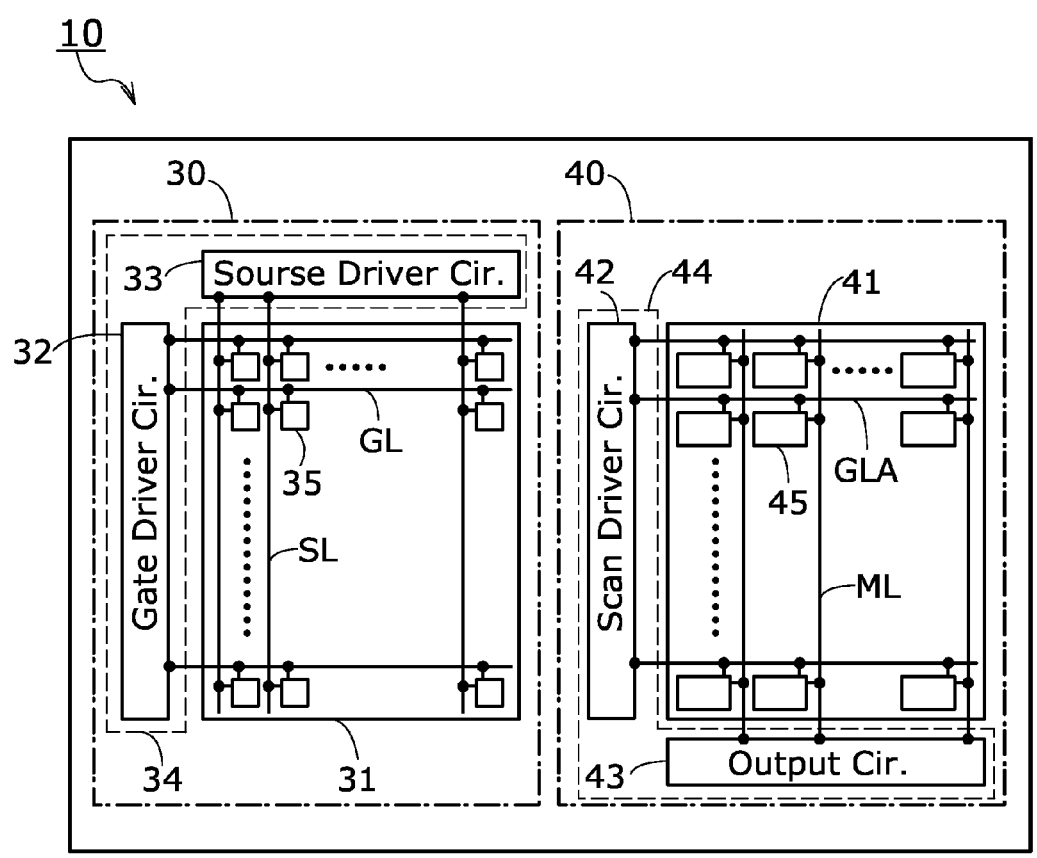
FIG. 1 is a block diagram illustrating a structure of a liquid crystal display device (LCD).

Embodiments of the present invention will be described in detail below. Note that the present invention is not limited to the description below and it will be readily appreciated by those skilled in the art that modes and details of the present invention can be changed in various ways without departing from the spirit and scope of the present invention. Therefore, the present invention should not be construed as being limited to the description in the embodiments below.

Some embodiments will be described below. A structure described in one embodiment can be combined with any of those described in the other embodiments as appropriate. In addition, in the case where some structure examples are described in one embodiment, any of the structure examples can be combined as appropriate.

In this specification, the same portions or portions having similar functions in the drawings used for the description in embodiments of the present invention are denoted by the same reference numerals, and the description thereof is not repeated in some cases. In this specification, the clock signal CLK is abbreviated to "a signal CLK," "CLK," or the like in some cases. The same applies to other components (e.g., signal, voltage, potential, circuit, element, electrode, and wiring).

Embodiment 1

A liquid crystal display device (LCD) is described as an example of a semiconductor device. FIG. 1 is a schematic block diagram illustrating an LCD.

<<Structure Example of LCD>>

An LCD 10 includes a pixel portion 31, a gate driver circuit 32, a source driver circuit 33, a sensor array 41, a scan driver circuit 42, and an output circuit 43, as illustrated in FIG. 1. A circuit block 30 including the pixel portion 31, the gate driver circuit 32, and the source driver circuit 33 forms a display portion. A circuit block 40 including the sensor array 41, the scan driver circuit 42, and the output circuit 43 forms a touch sensor. The gate driver circuit 32 and the source driver circuit 33 are collectively referred to as a peripheral circuit 34. The scan driver circuit 42 and the output circuit 43 are collectively referred to as a peripheral circuit 44. The circuit block 30 and the circuit block 40 are modularized to form a liquid crystal (LC) panel.

<Display Portion>

The pixel portion 31 includes a plurality of pixel circuits 35, a plurality of wirings GL, and a plurality of wirings SL. The pixel circuits 35 are arranged in a two-dimensional array. One wiring GL and one wiring SL are provided for the pixel circuits 35. The pixel circuits 35 in the same row are electrically connected to the common wiring GL, and the pixel circuits 35 in the same column are electrically connected to the common wiring SL. The wirings GL are electrically connected to the gate driver circuit 32. The wirings SL are electrically connected to the source driver circuit 33. In accordance with a control signal (e.g., a gate start pulse signal or a gate clock signal) input from the outside of the circuit block 30, the gate driver circuit 32 generates a signal and outputs it to the wiring GL. This signal selects the pixel circuit 35 to which a data signal is to be written. In accordance with a control signal (e.g., a source start pulse signal or a source clock signal) input from the outside of the circuit block 30, the source driver circuit 33 processes an image signal to generate a data signal, and outputs it to the wiring SL.

<Touch Sensor>

The sensor array 41 includes a plurality of sensor circuits 45, a plurality of wirings GLA, and a plurality of wirings ML. The sensor circuit 45 can function as a capacitive touch sensor. The sensor circuit 45 includes at least a capacitor and a switching element that controls the conduction state between the sensor circuit 45 and the wiring ML. The switching element may be a transistor. The sensor circuits 45 are arranged in a two-dimensional array. A wiring GLA and a wiring ML are provided for the sensor circuits 45. The sensor circuits 45 in the same row are electrically connected to the common wiring GLA, and the sensor circuits 45 in the same column are electrically connected to the common wiring ML. The scan driver circuit 42 has a function of generating a control signal that controls the conduction state of the switching element in the sensor circuit 45. The output circuit 43 has a function of amplifying a signal of the wiring ML and outputting it to the outside of the circuit block 40. A signal output from the output circuit 43 corresponds to a sensing signal that determines whether or not a finger or the like is proximate to the sensor circuit 45.

Figure 2:
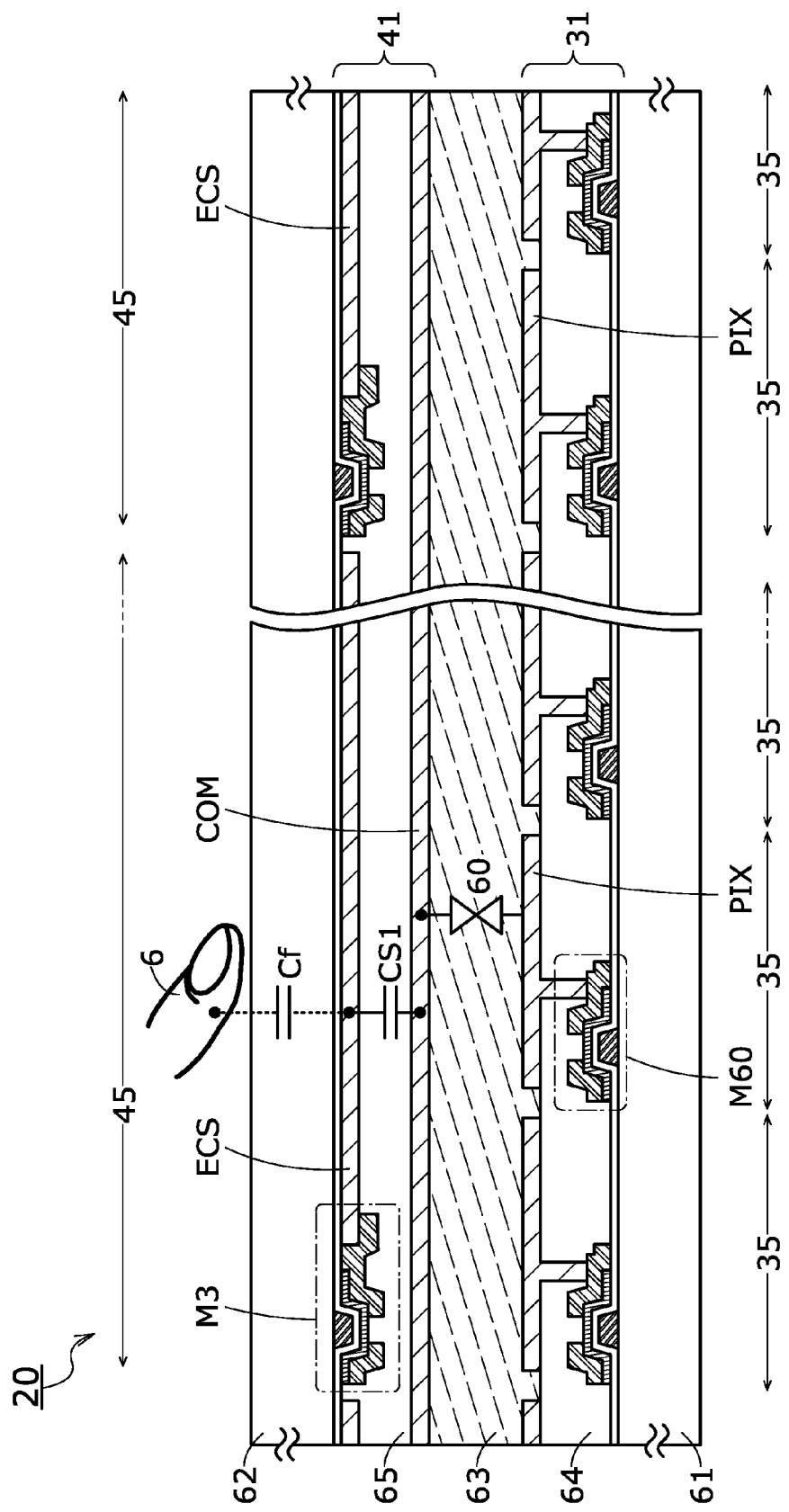
FIG. 2 is a cross-sectional view illustrating a structure example of an LC panel.

FIG. 2 is a schematic cross-sectional view illustrating a device structure example of an LC panel. An LC panel 20 in FIG. 2 includes a pair of substrates 61 and 62. The substrate 61 is spaced from and opposed to the substrate 62. A liquid crystal layer 63 is provided between the substrates 61 and 62. The pixel portion 31 is formed over the substrate 61.

Although not illustrated, the peripheral circuit 34 is formed on the substrate 61 at the same step of forming the pixel portion 31. Alternatively, part of the peripheral circuit 34 may be formed on the substrate 61 at the same step of forming the pixel portion 31 and an IC chip including the other part of the peripheral circuit 34 may be mounted on the substrate 61. Further alternatively, the whole peripheral circuit 34 may be included in an IC chip. The sensor array 41 is formed on the substrate 62. Although not illustrated, the peripheral circuit 44 is formed on the substrate 62 at the same step of forming the sensor array 41. Alternatively, part of the peripheral circuit 44 may be formed on the substrate 62 at the same step of forming the sensor array 41 and an IC chip including the other part of the peripheral circuit 44 may be mounted on the substrate 62. Further alternatively, the whole peripheral circuit 44 may be included in an IC chip. Examples of methods of mounting an IC chip include a chip on glass (COG) method, a chip on film (COF) method, a wire bonding method, and a tape automated bonding (TAB) method.

The substrate 61 is opposed to the substrate 62 such that the pixel portion 31 and the sensor array 41 overlap with each other. In FIG. 2, only the components formed over the substrate 61 are referred to as the pixel portion 31, but the pixel portion 31 may include the liquid crystal layer 63 and an electrode COM.

FIG. 2 schematically illustrates a cross-sectional structure of the pixel circuits 35 and the sensor circuits 45. The pixel circuit 35 includes a transistor M60 and an electrode PIX. A gate of the transistor M60 is electrically connected to the wiring GL, a first terminal of the transistor M60 is electrically connected to the wiring SL, and a second terminal of the transistor M60 is electrically connected to the electrode PIX. An insulating layer 64 covers the transistor M60. The electrode PIX is formed over the insulating layer 64. The sensor circuit 45 includes a transistor M3 and a capacitor CS1. An electrode ECS has a region overlapping with the electrode COM. The electrode ECS, the electrode COM, and an insulating layer 65 form the capacitor CS1. One electrode ECS is provided in each sensor circuit 45. The electrode COM is formed of one conductive film that is common to the all sensor circuits 45 in the sensor array 41. Each of the electrode PIX, the electrode ECS, and the electrode COM is formed of a single conductive film or stacked conductive films. Each of the insulating layers 64 and 65 is formed of a single insulating film or stacked insulating films. The electrode PIX functions as a pixel electrode and has a region overlapping with the electrode COM. The electrode PIX, the electrode COM, and the liquid crystal layer 63 form a liquid crystal element 60.

One electrode ECS overlaps with one or more electrodes PIX. For example, in the case where the pixel circuits 35 are arranged in n rows and m columns (each of n and m is an integer greater than or equal to 1) in the pixel portion 31, one sensor circuit 45 is provided for the pixel circuits 35 in k rows and j columns (each of k and j is an integer, $1 \leq k \leq n$, $1 \leq j \leq m$). The size of the electrode ECS can be determined depending on the electrostatic capacitance of the capacitor CS1.

The device structures of the transistors M60 and M3 are not limited to the example illustrated in FIG. 2. Each of the transistors M60 and M3 may be a bottom-gate transistor, a top-gate transistor, or a dual-gate transistor that includes a gate (a front gate) and a bottom gate. A semiconductor region in each of the transistors M60 and M3 may be formed of a semiconductor layer containing a Group 4 element typified by silicon or germanium, or an oxide semiconductor layer containing a metal oxide. For example, the semiconductor region in each of the transistors M60 and M3 may be formed of a polycrystalline silicon layer, a microcrystalline silicon layer, an amorphous silicon layer, an In—Ga—Zn oxide layer, or the like. The semiconductor regions in the transistor formed on the substrate 61 and the transistor formed on the substrate 62 may be formed with the same semiconductor material or different semiconductor materials, and may have the same crystal structure or different crystal structures.

Each of the electrodes PIX, COM, and ECS is formed of a light-transmitting conductive film. Typical examples of materials of the light-transmitting conductive film are metal oxides, such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, and indium tin oxide to which silicon oxide is added. A light-transmitting conductive film containing any of these materials can be formed by a sputtering method or the like. The light-transmitting conductive film can also be formed with the same material as the oxide semiconductor film that can be used for the semiconductor region of the transistor. When an impurity such as hydrogen is added to the oxide semiconductor film, the oxide semiconductor film has a lower resistance and can be used as the light-transmitting conductive film.

The LCD 10 can be a transmissive LCD when the electrode PIX is formed of the light-transmitting conductive film, whereas the LCD 10 can be a reflective LCD when the electrode PIX is formed of a reflective conductive film. The LCD 10 can be a transflective LCD when part of the electrode PIX is formed of the light-transmitting conductive film and the other part is formed of the reflective conductive film. An example of the reflective conductive film is a metal film such as an aluminum film or a silver film.

A large number of microcapsules each containing two electrophoretic particles and a liquid, or a large number of solid particles (e.g., silicon beads) each colored with two colors are provided instead of the liquid crystal layer 63 in FIG. 2, whereby a display panel of an electronic paper display device can be provided.

In the pixel circuit 35 of the LC panel 20 in FIG. 2, one electrode of the capacitor CS1 and one electrode of the liquid crystal element 60 are formed of the common conductive film (the common electrode COM). The substrate 62 that supports the sensor array 41 is a counter substrate of the LC panel 20. The LC panel 20 does not need an additional support substrate for incorporating the sensor array 41. With this device structure, increases in the thickness and weight of the LC panel 20 can be prevented even when the LC panel 20 includes a touch sensor. Therefore, this embodiment can provide a thin and lightweight LCD including a touch sensor. Accordingly, the LCD of this embodiment is highly suitable for a display portion of a portable information terminal. An information terminal using the LCD of this embodiment in its display portion can be thin and lightweight. The LCD of this embodiment is highly suitable for a display portion of, for example, a wearable (e.g., glasses-type, bracelet-type, pendant-type, ring-type, or wristwatch type) information terminal.

A method of detecting the touch position on the LC panel 20 is described. For example, when a finger 6 approaches a screen of the LC panel 20, an electrostatic capacitance Cf is coupled with the electrode ECS. When the electrode ECS is electrically floating, the potential of the electrode ECS is changed by the electrostatic capacitance Cf. By detecting this potential change, an address (coordinates) of the sensor circuit 45 which the finger 6 approaches can be obtained. The sensor circuit 45 has functions of detecting the electrostatic capacitance Cf caused by contact or approach of an object such as the finger 6, generating a signal in accordance with the potential of the electrode ECS, and outputting the signal to the wiring ML.

<Exploded View of LCD>

Figure 3:
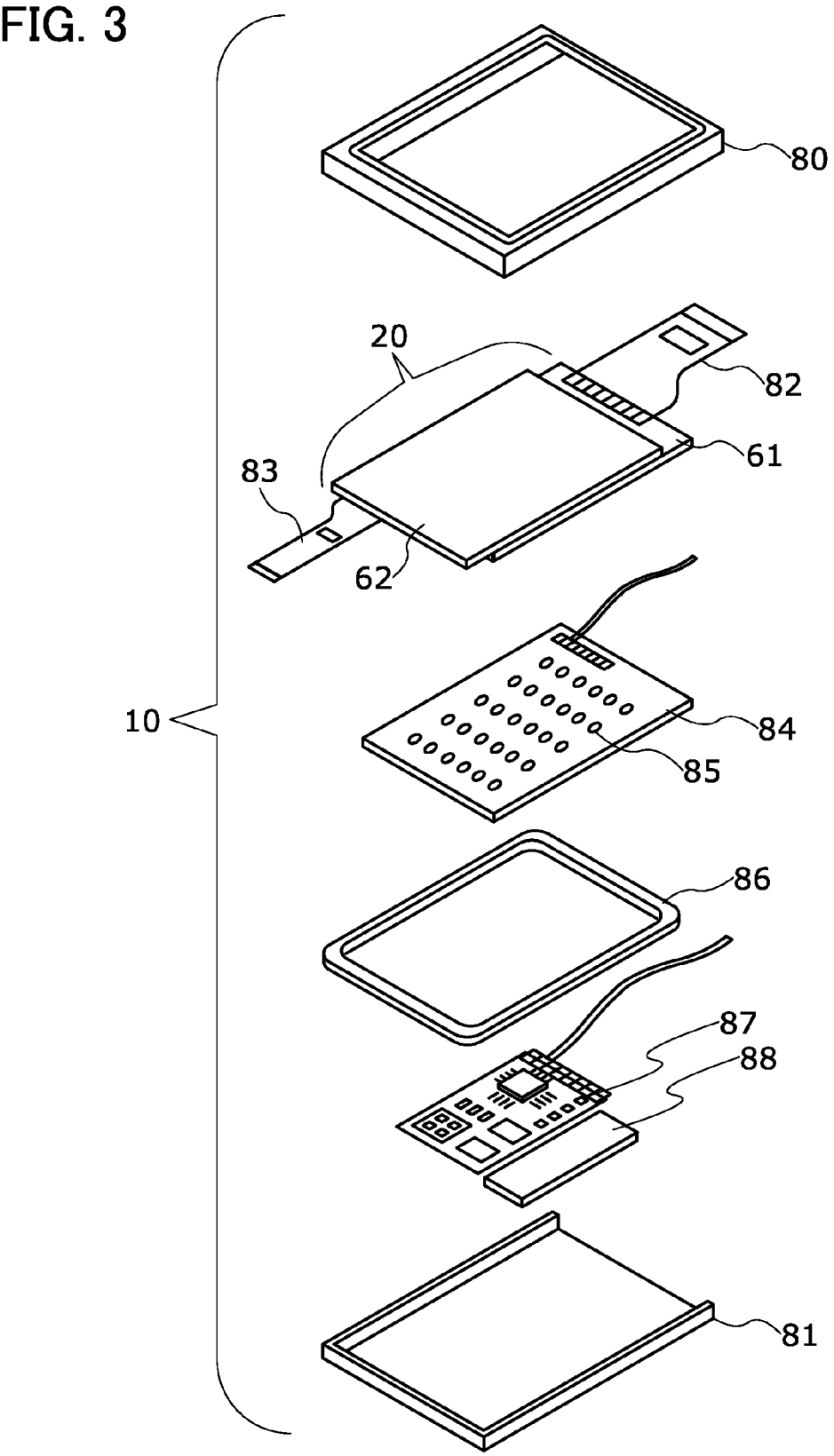
FIG. 3 is an exploded view illustrating a structure example of an LCD.

The LCD 10 includes a power supply circuit, a power supply control device, a control circuit, a polarizing plate, a backlight unit, and the like in addition to the LC panel 20. FIG. 3 is an exploded view illustrating a structure example of the LCD 10.

As illustrated in FIG. 3, the LCD 10 includes an upper cover 80, a lower cover 81, the LC panel 20, a backlight unit 84, a frame 86, a printed board 87, and a battery 88. The LC panel 20 and the like are interposed between the upper cover 80 and the lower cover 81. The shapes and sizes of the upper cover 80 and the lower cover 81 can be changed depending on the size of the LC panel 20.

The backlight unit 84 includes a light source 85. A light diffusion plate whose end portion is provided with the light source 85 may be used as the backlight unit 84. In addition, a wavelength conversion member may be provided between the backlight unit 84 and the LC panel 20. The wavelength conversion member contains a wavelength conversion substance such as a fluorescent pigment, a fluorescent dye, or a quantum dot. The wavelength conversion substance can absorb light from the backlight unit 84 and convert part of or the whole of the light into light with another wavelength. The quantum dot that is one wavelength conversion substance is a particle having a diameter of from 1 nm to 100 nm. With use of the wavelength conversion member containing a quantum dot, the color reproducibility of the display device can be increased. Furthermore, the wavelength conversion member may function as a light guide plate.

The backlight unit 84 can be omitted depending on the display panel structure. In the case of a reflective LC panel or an electronic paper display panel, the backlight unit 84 is not needed. The frame 86 has a function of protecting the LC panel 20 and a function as an electromagnetic shield for blocking electromagnetic waves generated by the operation of the printed board 87. The frame 86 may function as a radiator plate.

The printed board 87 includes a power supply circuit, a control circuit, a signal processing circuit for outputting a video signal and a clock signal, a signal processing circuit that processes a signal output from the circuit block 40 (touch sensor). A power supply that supplies power to the power supply circuit may be an external commercial power supply or the built-in battery 88. The battery 88 can be omitted in the case of using a commercial power supply. An FPC 82 and an FPC 83 are electrically connected to the LC panel 20. Via the FPC 82, power or a signal is input to the circuit block 30 formed over the substrate 61. Via the FPC 83, power or a signal is input to the circuit block 40 formed on the substrate 62. A signal output from the circuit block 40 is input to the signal processing circuit of the printed board 87 via the FPC 83.

Examples of substrates that can be used as the substrates 61 and 62 include a non-alkali glass substrate, a barium borosilicate glass substrate, an aluminoborosilicate glass substrate, a ceramic substrate, a quartz substrate, a sapphire substrate, a metal substrate, a stainless steel substrate, a plastic substrate, a polyethylene terephthalate substrate, and a polyimide substrate.

The substrates 61 and 62 may be different from support substrates (e.g., glass substrates) for forming the circuit blocks 30 and 40. For example, after the circuit blocks 30 and 40 are formed, their support substrates may be removed and flexible substrates may be attached to the circuit blocks 30 and 40 with bonding layers. In that case, the flexible substrates correspond to the substrates 61 and 62. With the use of the flexible substrates as the substrates 61 and 62, the LC panel 20 can be deformable (e.g., can be bendable or foldable).

Examples of the flexible substrates are a plastic film substrate and a resin film substrate. These film substrates are formed with, for example, polyethylene terephthalate (PET), polyethylene naphthalate (PEN), polyether sulfone (PES), acrylic, polypropylene, polyester, polyvinyl fluoride, polyvinyl chloride, polyester, polyamide, polyimide, aramid, or epoxy. Alternatively, thin glass substrates with a thickness of greater than or equal to 50 μm and less than or equal to 500 μm can be used as the substrates 61 and 62. For example, in the case where glass substrates are used as the substrates 61 and 62, after circuits are formed over the substrates 61 and 62, the thicknesses of the substrates 61 and 62 may be reduced to the above thickness by polishing or the like.

In the case where the LC panel 20 is deformable, it is preferable that the backlight unit 84 be also deformable. Such a backlight is, for example, a surface-emitting lighting device which is provided on a flexible substrate and uses an organic electroluminescent (EL) element as a light source. Specific circuit configuration and device structure of the LCD are described below with reference to FIGS. 4A and 4B, FIGS. 5A and 5B, FIGS. 6A and 6B, FIG. 7, and FIGS. 8A and 8B.

<<Circuit Configuration Example>>

Figure 4A:
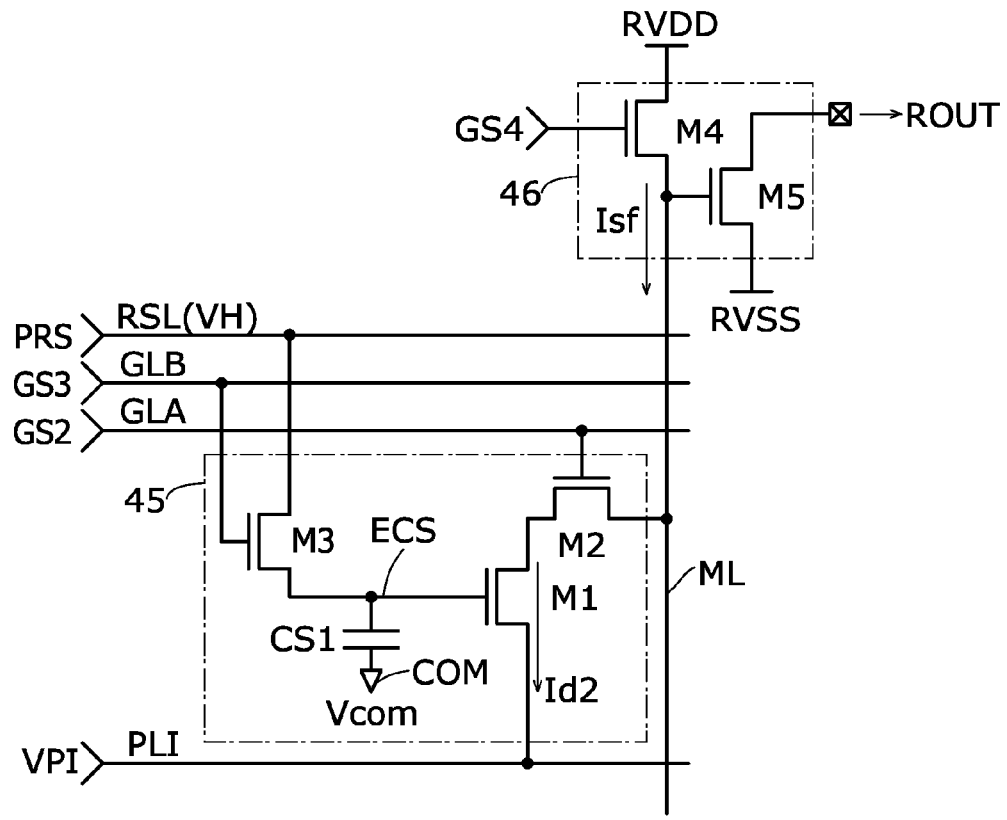
FIGS. 4A and 4B are circuit diagrams illustrating configuration examples of circuits in an LCD.
Figure 4B:
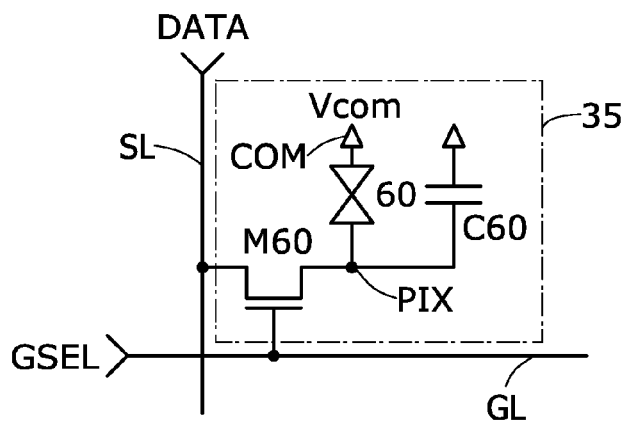

FIGS. 4A and 4B illustrate a circuit configuration example of the LC panel 20. FIG. 4A illustrates the sensor circuit 45 and an output circuit 46. FIG. 4B illustrates the pixel circuit 35.

<Sensor Circuit>

The sensor circuit 45 illustrated in FIG. 4A is electrically connected to the wiring GLA, a wiring GLB, a wiring RSL, a wiring PLI, and the wiring ML. The sensor circuit 45 includes transistors M1 to M3 and the capacitor CS1. A pair of electrodes of the capacitor CS1 corresponds to the electrode ECS and the electrode COM. The electrode ECS is connected to a gate of the transistor M1. A first terminal of the transistor M1 is electrically connected to the wiring PLI. A second terminal of the transistor M1 is electrically connected to a first terminal of the transistor M2. The transistor M2 functions as a switch that controls the conduction state between the second terminal of the transistor M1 and the wiring ML. The transistor M3 functions as a switch that controls the conduction state between the electrode ECS (the gate of the transistor M1) and the wiring RSL. The conduction states of the transistor M2 and the transistor M3 are controlled by a signal GS2 and a signal GS3, respectively. The wirings GLA and GLB are electrically connected to the scan driver circuit 42. The scan driver circuit 42 generates the signals GS2 and GS3.

The transistor M1 has a function of converting a potential of the electrode ECS into a current signal. A potential VPI, which is a high power supply potential of the transistor M1, is supplied to the wiring PLI. The transistor M2 functions as a selection transistor that outputs the current signal generated by the transistor M1 to the wiring ML. The transistor M3 has a function of resetting the electrode ECS at a certain potential (or precharging the electrode ECS). When the transistor M3 is turned on, a signal PRS is input to the electrode ECS. From the outside of the circuit block 40, the signal PRS may be input to the wiring PRS and the potential VPI may be input to the wiring PLI. Alternatively, the signal PRS may be generated by the scan driver circuit 42. In that case, the wiring RSL is electrically connected to the scan driver circuit 42.

FIG. 4A illustrates an example of a 3T1C type sensor circuit composed of three transistors and one capacitor, but the structure of the sensor circuit 45 is not limited to this. For example, the sensor circuit 45 can be a 2T1C type circuit without the transistor M3, or a 1T1C type circuit composed of one transistor and one capacitor, like a general memory cell of a DRAM cell. Alternatively, the sensor circuit 45 may include three or more transistors and/or one or more capacitors.

<Output Circuit>

The output circuit 46 is included in the output circuit 43 (FIG. 1) and electrically connected to the wiring ML. The output circuit 46 includes a transistor M4 and a transistor M5. A potential RVDD is a high power supply potential of the output circuit 46 and a potential RVSS is a low power supply potential of the output circuit 46. A signal GS4 is input to a gate of the transistor M4. The signal GS4 can be a fixed potential that can turn on the transistor M4. The potential RVSS is input to a first terminal of the transistor M5. A second terminal of the transistor M5 is connected to an output terminal of the output circuit 46. The output circuit 46 has functions of converting a current Isf flowing through the wiring ML into a potential and amplifying the potential.

<Example of Driving Method>

An example of a method of driving the sensor circuit 45 and the output circuit 46 is described.

The electrode COM is fixed at a constant potential (Vcom). Vcom is an appropriate potential for driving the pixel circuit 35, and may be the ground potential, for example. First, the potential of the electrode ECS is reset. The signal PRS is set at a high potential VH to turn on only the transistor M3. This makes the electrode ECS have the high potential VH, which is a potential at which the transistor M1 is turned on. The transistor M3 is turned off to make the electrode ECS electrically floating. Through these steps, the reset operation is completed. This operation can be called precharge operation in which the potential of the electrode ECS is set at VH.

Next, the transistor M2 is turned on to detect a change in electrostatic capacitance coupled with the electrode ECS. Touch operation by a user increases the electrostatic capacitance coupled with the electrode ECS, which makes the potential of the electrode ECS lower than VH. Accordingly, a drain current Id2 flowing through the transistor M1 becomes small, the current Isf flowing through the wiring ML also becomes small, and the potential of the signal ROUT decreases. By measuring a potential of the signal ROUT output from the output circuit 46 or detecting a change in the potential, whether the electrostatic capacitance coupled with the electrode ECS has changed or not can be determined.

<Pixel Circuit>

FIG. 4B illustrates an example of the pixel circuit 35. The pixel circuit 35 illustrated in FIG. 4B includes the transistor M60, the liquid crystal element 60, and a capacitor C60. The electrode PIX and the electrode COM are a pair of electrodes of the liquid crystal element 60. The capacitor C60 may be provided as needed. The conduction state of the transistor M60 is controlled by a signal GSEL. The signal GSEL is generated by the gate driver circuit 32. When the transistor M60 is turned on, a data signal DATA flowing through the wiring SL is written to the electrode PIX.

<Example of Driving Method of LCD (Pixel Circuit)>

In general, in an LCD, an image is displayed by inversion driving in which the polarity of a signal (data signal) that is written to a pixel is inverted every time data is rewritten. Because of the properties of a liquid crystal material, voltage-transmittance (V-T) characteristics of a pixel vary depending on the polarity of the data signal. Thus, a change in transmittance of the pixel due to polarity inversion of the data signal is probably a cause of eye strain due to an LCD.

In view of the above, in this embodiment, loads on users' eyes are reduced by reducing the number of data rewriting operations (the frequency of polarity inversion of data). Thus, the LCD 10 illustrated in FIG. 1 has at least two driving methods (display modes). One is a general driving method for displaying a moving image in which data is rewritten every frame. This method is called "normal driving". The other is a driving method in which data rewriting is stopped after data write processing is executed. This method is called "idling stop (IDS) driving". In the IDS driving, data is rewritten less frequently than that in the normal driving. The refresh rate (unit: Hz) in the IDS driving can be lower than that in the normal driving. For example, the refresh rate in the IDS driving can be approximately $\frac{1}{10}$ to $\frac{1}{100}$ of that in the normal driving.

Here, a mode in which the LCD displays images in the normal driving is called a normal mode, and a mode in which the LCD displays images in the IDS driving is called an IDS mode. A moving image is displayed in the normal driving. A still image is displayed in the normal driving or the IDS driving. When a signal that determines a display mode is input to the control circuit (not illustrated) in the LCD 10, the control circuit controls the peripheral circuit 34 so that display is performed in the display mode.

In the case of displaying a still image, it is not necessary to rewrite data every frame because image data is not changed every frame. When the LCD 10 is driven in the IDS mode for displaying a still image, screen flickering can be suppressed and power consumption can be reduced. The normal driving and the IDS driving are described below with reference to FIGS. 5A and 5B and FIGS. 6A and 6B.

Figure 5A:
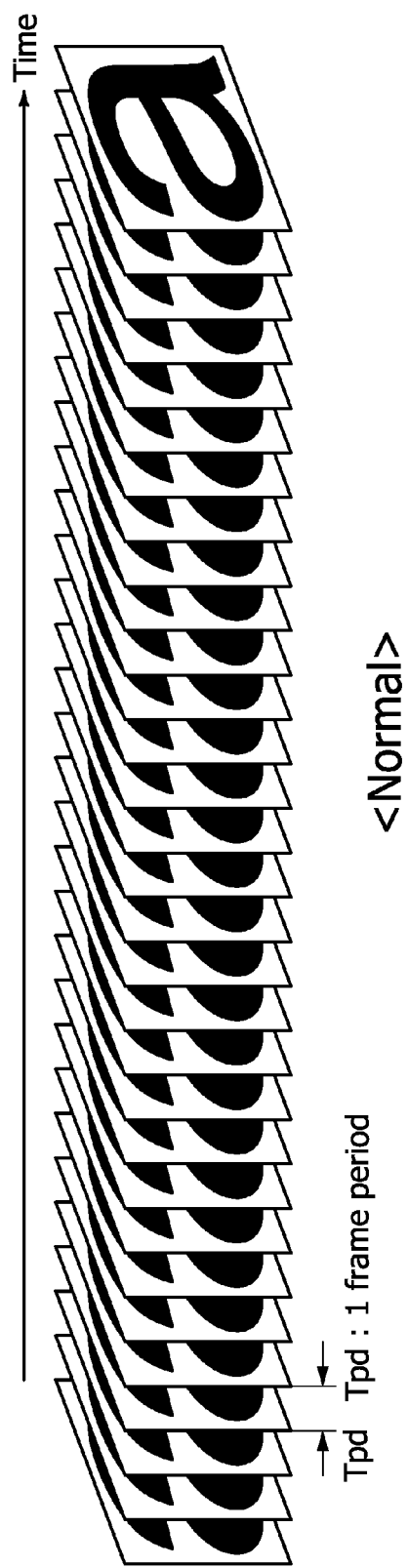
FIGS. 5A and 5B are timing charts showing an example of a method of driving an LCD.
Figure 5B:
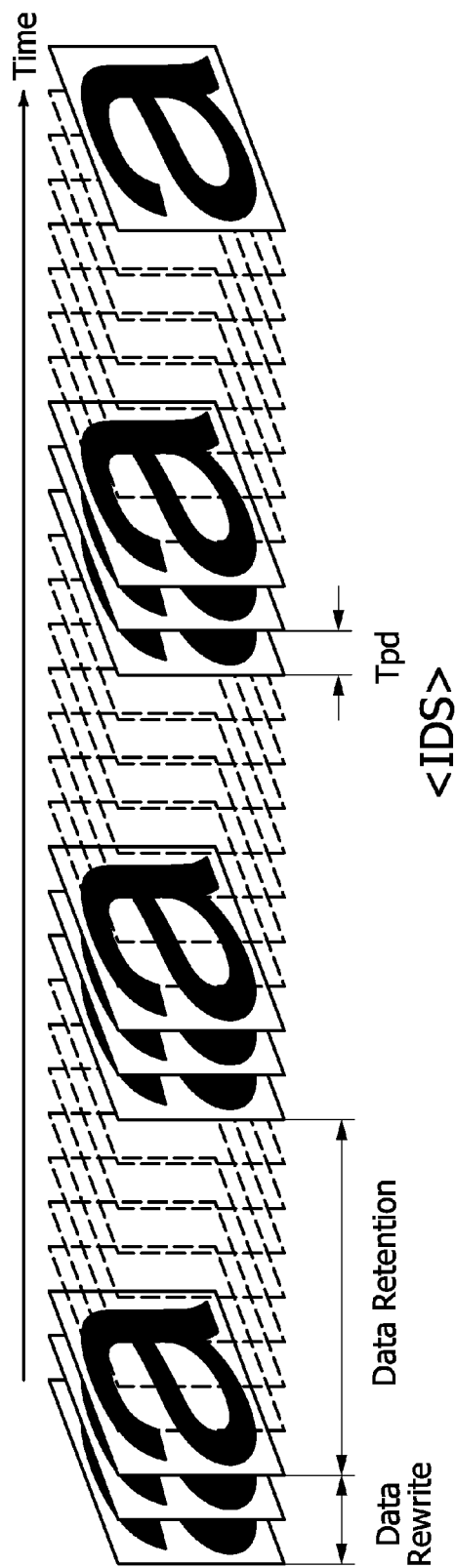

FIG. 5A shows a method of displaying a still image in the normal driving, and FIG. 5B shows a method of displaying a still image in the IDS driving. FIGS. 6A and 6B are timing charts showing examples of the normal driving and the IDS driving, respectively. In FIGS. 6A and 6B, Video is an image signal input to the LC panel 20, GVDD is a high power supply potential of the gate driver circuit 32, GCLK is a gate clock signal input to the gate driver circuit 32, GSP is a gate start pulse signal input to the gate driver circuit 32, and DATA is a data signal output from the source driver circuit 33 to the wiring SL.

<Normal Driving>

The normal driving is a driving method in which inversion driving is performed every frame period (Tpd) to rewrite pixel data periodically. When GSP is input, the gate driver circuit 32 generates a signal GOUT and outputs it to the wiring GL. The source driver circuit 33 generates the data signal DATA and outputs it to the wiring SL. As shown in FIG. 6A, the polarity of DATA input to each pixel circuit 35 is inverted every frame period. Typical examples of the inversion driving include dot inversion driving, gate line inversion driving, and source line inversion driving. The polarity of DATA is determined on the basis of a potential Vcom of the electrode COM. The polarity of DATA is positive when the potential of DATA is higher than Vcom, and is negative when the potential of DATA is lower than Vcom.

<IDS Driving>

In the IDS driving, data is periodically rewritten at a lower refresh rate than that in the normal driving. Accordingly, the data retention period becomes longer than one frame period. FIG. 5B shows an example in which data is rewritten every ten frames. In this case, the refresh rate of the IDS driving is one tenth of that of the normal driving. For example, when the refresh rate of the normal driving is 60 Hz, the refresh rate of the IDS driving shown in FIG. 5B is 6 Hz. As shown in FIG. 5B and FIG. 6B, data rewriting processing in the IDS driving includes two kinds of processing: data rewriting (also referred to as writing processing) and data retention.

First, data rewriting is performed once or more times at the same refresh rate (period Tpd) as that of the normal driving, whereby data is written to the pixel circuit 35. After the data writing, generation of gate signals in the gate driver circuit 32 is stopped to suspend data rewriting. As a result, the transistors M60 are turned off in all the pixel circuits 35 so that data is retained.

The number of data rewriting operations may be one or more. Even in the IDS driving, data may be rewritten at the same refresh rate as that of the normal driving. The number of data rewriting operations can be set in consideration of the refresh rate and the like of the normal driving and IDS driving. FIG. 5B and FIG. 6B each show an example in which the number of data rewriting operations is three.

The number of data rewriting operations is adjusted so that the polarity of the last DATA written to the pixel circuit 35 is opposite to that of DATA that is retained in the pixel circuit 35 in the preceding data retention period of the IDS mode. This inhibits degradation of the liquid crystal element 60 due to the IDS driving. For example, in the case where the number of data rewriting operations is an odd number, DATA having a polarity opposite to that of DATA that is retained in the pixel circuit 35 in the preceding data retention period of the IDS mode is written to the pixel circuit 35 in the first rewriting.

As can be seen from FIGS. 5A and 5B and FIGS. 6A and 6B, in the IDS mode, a still image can be displayed while data is rewritten less frequently than in the normal mode. Accordingly, display of a still image in the IDS mode can suppress screen flickering, thereby reducing eye strain.

As shown in FIG. 6B, in the IDS mode, the supply of control signals (GSP and GCLK) to the gate driver circuit 32 is stopped in the data retention period. Therefore, the LCD 10 may stop the supply of the power supply potential GVDD to the gate driver circuit 32 after stopping the supply of control signals (GSP and GCLK). In the data retention period, the supply of control signals to the source driver circuit 33 is also stopped; thus, the power supply voltage can also be stopped being supplied to the source driver circuit 33. That is, the IDS driving makes it possible to achieve the LCD 10 that performs eye-friendly display at low power.

Note that in this specification, the phrase "a signal or voltage is not supplied to a wiring, a terminal, and the like" means that a signal or voltage that does not have a predetermined level for operating a circuit is applied to the wiring and the like, and/or the wiring and the like are brought into an electrically floating state.

In both the normal driving and the IDS driving, a potential supplied to the electrode PIX of the pixel circuit 35 needs to be retained until the next data rewriting. A change in potential of the electrode PIX leads to the degradation of display quality of the LCD 10 or flickering. Thus, in order to reduce the amount of change in voltage retained in the liquid crystal element 60, a transistor having an extremely small off-state current is preferably used as the transistor M60. The off-state current of a transistor refers to current flowing between a source and a drain of the transistor in an off state. The off state of an n-channel transistor refers to a state in which the gate voltage is sufficiently lower than the threshold voltage.

The off-state current of the transistor M60 is preferably as low as possible. Specifically, in the transistor M60, the off-state current per micrometer of channel width is preferably lower than or equal to 100 zA/μm. Since the off-state current is preferably as low as possible, the normalized off-state current is preferably lower than or equal to 10 zA/μm, more preferably lower than or equal to 1 zA/μm, and still more preferably lower than or equal to 10 yA/μm. An example of a transistor with such an extremely small off-state current is a transistor in which a semiconductor region is formed using an oxide semiconductor layer that has a wider band gap (greater than or equal to 3.0 eV) than Si or Ge (such a transistor is referred to as an OS transistor). Therefore, the transistor M60 is preferably an OS transistor. In that case, a transistor in the peripheral circuit 34, which is formed over substrate 61 together with the pixel circuit 35, may also be an OS transistor.

By reducing impurities serving as electron donors, such as moisture or hydrogen, and also reducing oxygen vacancies, an i-type (intrinsic) or a substantially i-type oxide semiconductor can be obtained. Here, such an oxide semiconductor is referred to as a highly purified oxide semiconductor. When a highly purified oxide semiconductor is used for a channel, the off-state current normalized by the channel width can be reduced to about several yoctoamperes per micrometer (yA/μm) to several zeptoamperes per micrometer (zA/μm).

An OS transistor preferably includes an oxide semiconductor containing at least indium (In) or zinc (Zn). The oxide semiconductor also preferably contains an element serving as a stabilizer for reducing a variation in electrical characteristics. Examples of such an element include Ga, Sn, Hf, Al, and Zr. Typical examples of the oxide semiconductor used for the OS transistor include an In—Ga—Zn oxide and an In—Sn—Zn oxide. The oxide semiconductor is described in more detail in Embodiment 2.

<<Structure Example of LC Panel>>

Figure 7:
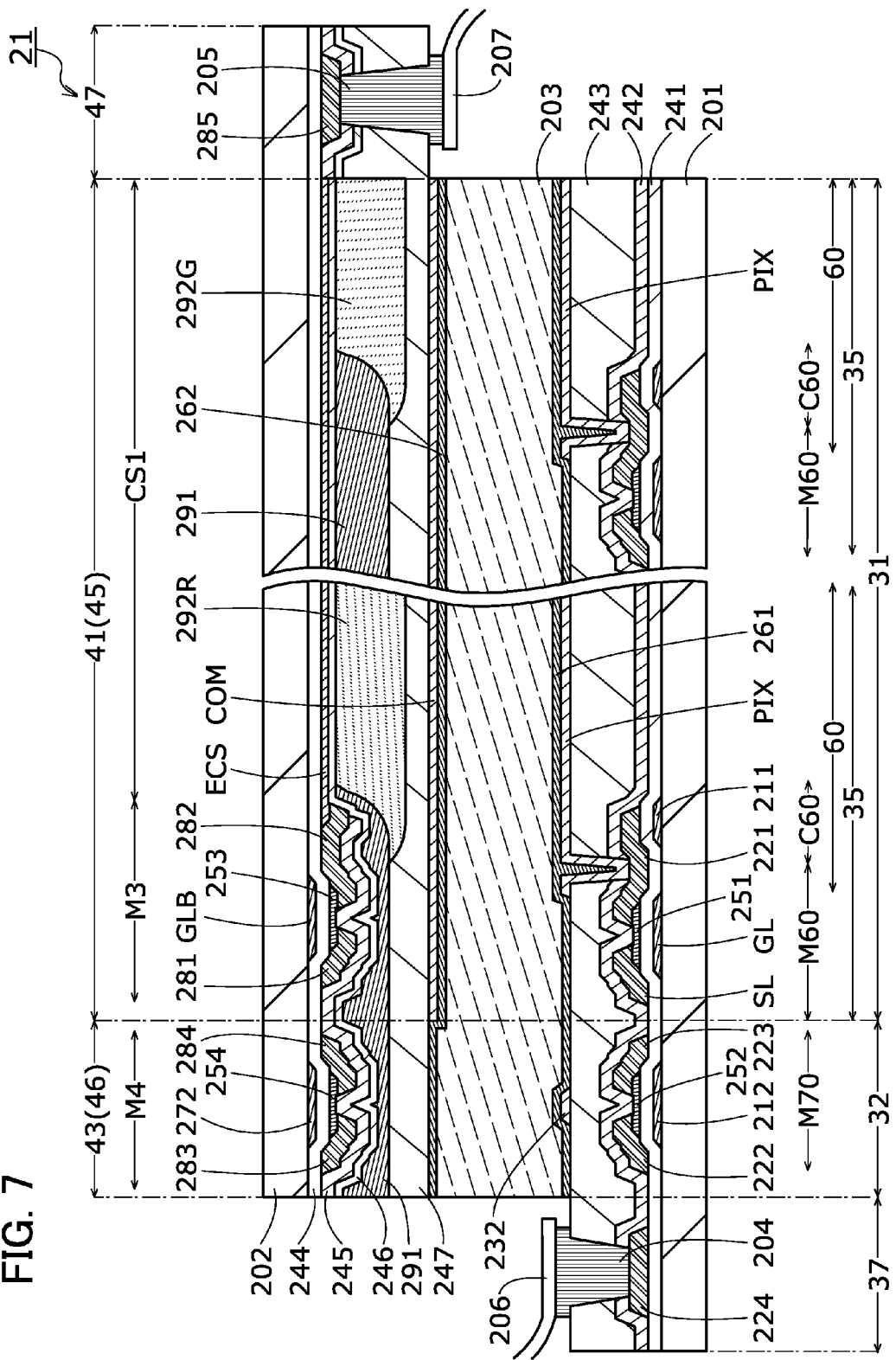
FIG. 7 is a cross-sectional view illustrating a structure example of an LC panel.

FIG. 7 is a cross-sectional view illustrating a device structure example of an LC panel. An LC panel 21 illustrated in FIG. 7 includes a substrate 201, a substrate 202, and a liquid crystal layer 203. The liquid crystal layer 203 is provided between the substrate 201 and the substrate 202. Transistors formed on the substrates 201 and 202 are OS transistors. The OS transistors are bottom gate transistors. A semiconductor region in the OS transistor is formed of a CAAC-OS layer with a c-axis aligned crystal part. In this specification, CAAC-OS refers to an oxide semiconductor with a c-axis aligned crystal part. The CAAC-OS is described in Embodiment 2.

The pixel portion 31 and the gate driver circuit 32 are formed on the substrate 201 at the same manufacturing step. The source driver circuit 33 is included in a COF chip (not illustrated) and mounted on the substrate 201. A transistor M70 illustrated in FIG. 7 is included in the gate driver circuit 32. The sensor array 41 and the peripheral circuit 44 (the scan driver circuit 42 and the output circuit 43) are formed on the substrate 202 at the same manufacturing step. FIG. 7 illustrates the transistor M3 in the sensor circuit 45 and the transistor M4 in the output circuit 43 (the output circuit 46). In the example of FIG. 7, the transistors formed on the substrates 201 and 202 have similar device structures and formed through similar manufacturing processes. Therefore, a backplane of a touch sensor can be manufactured with equipment for manufacturing a backplane of an LC panel (a display portion), whereby equipment investment and a manufacturing cost for an LC panel with a touch panel can be suppressed.

<Backplane of Display Portion>

A first conductive layer is formed over the substrate 201. A base insulating film may be formed over the substrate 201 and the first conductive layer may be formed over the base insulating film. The first conductive layer includes the wiring GL, a first electrode 211 of the capacitor C60, and a gate electrode (front gate electrode) 212 of the transistor M70. They are formed of the same conductive film at the same step. The wiring GL has a region serving as a gate electrode of the transistor M60. An insulating layer 241 is formed to cover the first conductive layer. The insulating layer 241 has regions serving as gate insulating layers of the transistors M60 and M70 and a region serving as a dielectric of the capacitor C60. Oxide semiconductor (OS) layers 251 and 252 are formed over the insulating layer 241. The OS layer 251 is a semiconductor region in the transistor M60, and the OS layer 252 is a semiconductor region in the transistor M70. A second conductive layer is formed over the insulating layer 241 and the semiconductor regions in the transistors M60 and M70. The second conductive layer includes the wiring SL, an electrode 221, an electrode 222, an electrode 223, and a terminal 224. They are formed of the same conductive film at the same step. The wiring SL and the electrode 221 each have a region serving as a source electrode or a drain electrode of the transistor M60. The electrode 221 has a region serving as a second electrode of the capacitor C60. The electrodes 222 and 223 each have a region serving as a source electrode or a drain electrode of the transistor M70. Depending on the circuit configuration, the electrodes 222 and 223 are provided as wirings in some cases. An insulating layer 242 and an insulating layer 243 are formed to cover the second conductive layer. The insulating layer 242 is used as a passivation film of the transistors M60 and M70. Being a base film of the electrode PIX, the insulating layer 243 is used as a planarization film.

A third conductive layer is formed over the insulating layer 243. The third conductive layer includes the electrode PIX and an electrode 232. They are formed of the same conductive film at the same step. The electrode PIX is electrically connected to the electrode 221. The electrode 232 serves as a back gate electrode of the transistor M70. The electrode 232 may be electrically connected to the electrode 212, or the electrode 232 may be supplied with a signal or a potential separately from the electrode 212 without being electrically connected to the electrode 212. An alignment film 261 is formed over the third conductive layer. The alignment film 261 may be formed as necessary.

<Backplane of Touch Sensor>

A first conductive layer is formed over the substrate 202. A base insulating film may be formed over the substrate 202 and the first conductive layer may be formed over the base insulating film. The first conductive layer includes the wiring GLB and a gate electrode (front gate electrode) 272 of the transistor M4. They are formed of the same conductive film at the same step. The wiring GLB has a region serving as a gate electrode of the transistor M3. An insulating layer 244 is formed to cover the first conductive layer. The insulating layer 244 has regions serving as gate insulating layers of the transistors M3 and M4. OS layers 253 and 254 and the electrode ECS are formed over the insulating layer 244. The OS layer 253 is a semiconductor region in the transistor M3, and the OS layer 254 is a semiconductor region in the transistor M4.

A second conductive layer is formed over the insulating layer 244, the OS layer 253, the OS layer 254, and the electrode ECS. The second conductive layer includes electrodes 281 to 284 and a terminal 285. They are formed of the same conductive film at the same step. The electrodes 281 and 282 each serve as a source electrode or a drain electrode of the transistor M3. The electrodes 283 and 284 each serve as a source electrode or a drain electrode of the transistor M4. Depending on the circuit configuration, the electrodes 281 to 284 are provided as wirings in some cases. Although not illustrated in FIG. 7, the wiring ML of the sensor array 41 is formed of the second conductive layer.

An insulating layer 245 and an insulating layer 246 are formed to cover the second conductive layer. The insulating layers 245 and 246 function as passivation films of the transistors M3 and M4. In the case where the electrode ECS and the OS layers 253 and 254 are formed of the same oxide semiconductor film, the insulating layer 246 is preferably an insulating film containing hydrogen. In that case, hydrogen is diffused from the insulating layer 246 into the oxide semiconductor film, so that the oxide semiconductor film can have lower resistance and thus can be used as an electrode. As the insulating layer 246, a silicon nitride film or a silicon nitride oxide film may be formed by a CVD method. By forming the electrode ECS using the same oxide semiconductor film as the OS layers 253 and 254, steps such as a film formation step and a light-exposure step for forming a resist mask can be omitted. The electrode ECS can be formed using a conductive film different from the oxide semiconductor film forming the OS layers 253 and 254.

A light-blocking layer 291, a color filter (CF) layer 292R, and a CF layer 292G are formed over the insulating layer 246. The light-blocking layer 291, the CF layer 292R, and the CF layer 292G are formed with a resin, for example. The light-blocking layer 291 is provided to overlap with the peripheral circuit 44 and the transistors M1 to M3 in the sensor circuit 45. Furthermore, the light-blocking layer 291 overlaps with the gate driver circuit 32 and a region in the pixel portion 31 which does not contribute to display (e.g., the wiring SL) on the substrate 201. The CF layers are formed to overlap with the pixel portion 31. The CF layer is a colored layer corresponding to a display color of the pixel circuit 35, and the red CF layer 292R and the green CF layer 292G are illustrated as typical examples in the example of FIG. 7. The light-blocking layer 291, the CF layer 292R, and the CF layer 292G may be formed on the substrate 201 side. In that case, the light-blocking layer 291, the CF layer 292R, and the CF layer 292G may be formed over the insulating layer 242, and the insulating layer 243 may be formed to cover the light-blocking layer 291, the CF layer 292R, and the CF layer 292G.

An insulating layer 247 is formed to cover the light-blocking layer 291, the CF layer 292R, and the CF layer 292G. The insulating layer 247 is used as a planarization film. The electrode COM is formed over the insulating layer 247. The electrode COM is formed of one conductive film in the sensor array 41. The electrode COM may be a plurality of sub-electrodes. In that case, the potential Vcom is supplied to each of the sub-electrodes. An alignment film 262 is formed to cover the electrode COM. The alignment film 262 may be formed as necessary.

Figure 8A:
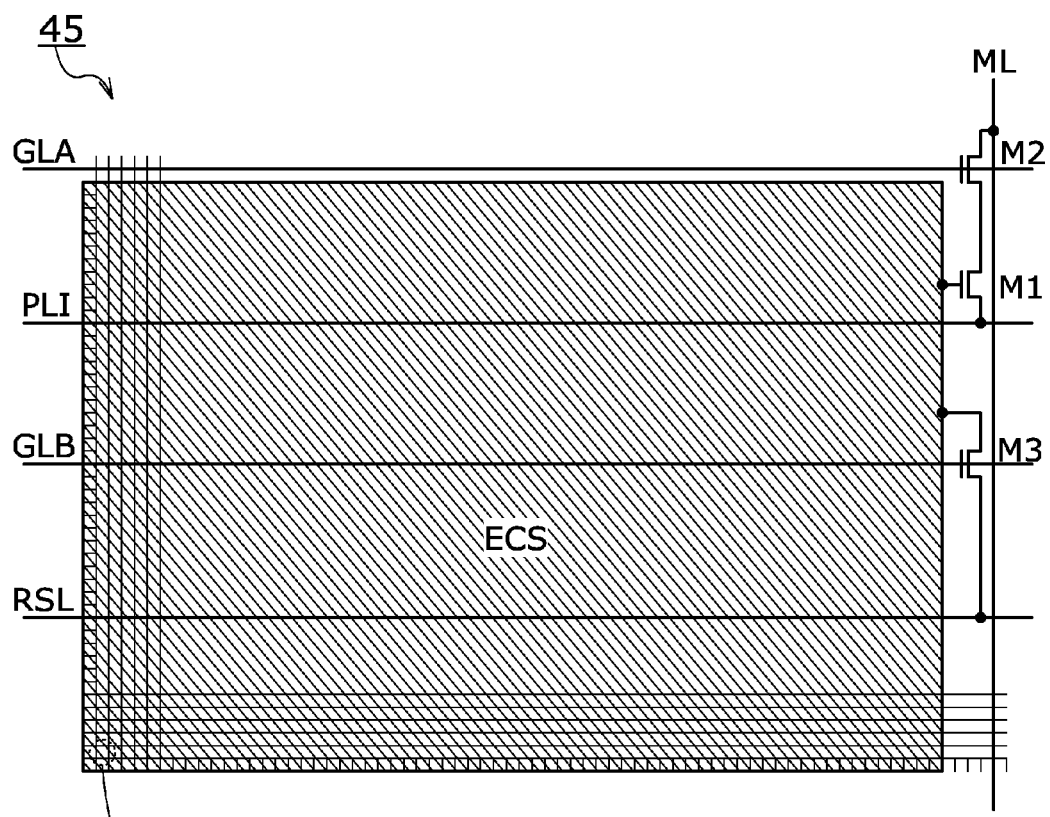
FIGS. 8A and 8B are schematic views illustrating an example of a layout of a sensor circuit.
Figure 8B:
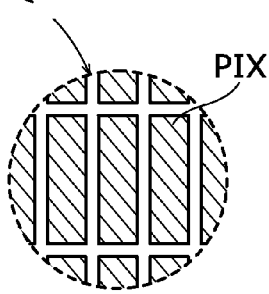

FIG. 8A schematically illustrates a layout example of the sensor circuit 45. The wiring ML having a narrow width is formed using a layer different from the electrode ECS, in which case parasitic capacitance of the electrode ECS can be small; therefore, the influence of noise can be suppressed and the detection sensitivity of the sensor circuit 45 can be prevented from decreasing. The wiring GLA, the wiring PLI, the wiring RSL, and the wiring GLB are formed of the first conductive layer.

The electrode COM overlaps with a plurality of electrodes. The electrode COM faces all the electrodes PIX in the pixel portion 31 and all the electrodes ECS in the sensor array 41. Note that the electrode COM is not illustrated in FIGS. 8A and 8B. To reduce the parasitic capacitance of the electrode COM, for example, a plurality of openings may be formed in a region overlapping with the wiring ML formed of the second conductive layer.

Each of the insulating layers 241 to 247 may be a single layer or stacked layers. Examples of these films include oxide films such as a silicon oxide film, an aluminum oxide film, and a hafnium oxide film; nitride films such as a silicon nitride film and an aluminum nitride film; oxynitride films such as a silicon oxynitride film and an aluminum oxynitride film; and nitride oxide films such as a silicon nitride oxide film and an aluminum nitride oxide film. Since the insulating layer 243 and the insulating layer 247 function as planarization films, each of them preferably includes at least an organic resin film. The organic resin film is preferably formed using a photosensitive resin material that can be easily processed (e.g., photopolymer, photosensitive acrylic, or photosensitive polyimide). Note that in this specification, oxynitride refers to a substance that contains more oxygen than nitrogen, and nitride oxide refers to a substance that contains more nitrogen than oxygen.

Each of the first conductive layer including electrodes and wirings and the second conductive layer including electrodes and wirings on the substrate 201 is formed of a single conductive film or stacked conductive films. Each of the first conductive layer including electrodes and wirings and the second conductive layer including electrodes and wirings on the substrate 202 is formed of a single conductive film or stacked conductive films. Examples of such a conductive film include a metal film of aluminum, chromium, copper, tantalum, titanium, molybdenum, tungsten, or the like; any of the metal films to which another metal element is added; an alloy film containing one or more kinds of the above metal elements; and a compound film containing one or more kinds of the above metal elements.

The OS layers 251 and 252 can be formed of a single oxide semiconductor film or stacked oxide semiconductor films. The OS layers 253 and 254 can be formed of a single oxide semiconductor film or stacked oxide semiconductor films. The oxide semiconductor film will be described later. Typical examples of the semiconductor material of the OS layers 251 to 254 include an In—Ga oxide, an In—Zn oxide, and an In—M—Zn oxide (M is Ti, Ga, Y, Zr, La, Ce, Nd, Sn, or Hf). For example, the OS layers 251 and 252 can be a three-layered In—Ga—Zn oxide film; the same applies to the OS layers 253 and 254. In the case where the first and third In—Ga—Zn oxide films are formed by a sputtering method, an In—Ga—Zn oxide target (the atomic ratio of In to Ga and Zn is 1:3:2) may be used. In the case where the second In—Ga—Zn oxide film is formed by a sputtering method, a polycrystalline In—Ga—Zn oxide target (the atomic ratio of In to Ga and Zn is 1:1:1) may be used. With these targets, the CAAC-OS films can be formed.

<<Film Formation Method>>

A sputtering method and a plasma CVD method are typical examples of a method of forming an insulating film, a conductive film, a semiconductor film, and the like. The insulating film, the conductive film, the semiconductor film, and the like may be formed by another method, for example, a thermal CVD method. A metal organic chemical vapor deposition (MOCVD) method or an atomic layer deposition (ALD) method can be employed as a thermal CVD method, for example.

Since plasma is not used for deposition, a thermal CVD method has an advantage that no defect due to plasma damage is generated. Deposition by a thermal CVD method may be performed in such a manner that a source gas and an oxidizer are supplied to a chamber at a time, the pressure in the chamber is set to an atmospheric pressure or a reduced pressure, and reaction is caused in the vicinity of or over a substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). In such a case, a first source gas is introduced, an inert gas (e.g., argon or nitrogen) or the like is introduced at the same time as or after the first source gas, and then a second source gas is introduced, whereby the source gases are not mixed. Note that in the case where the first source gas and the inert gas are introduced at a time, the inert gas serves as a carrier gas. The inert gas may also be introduced at the same time as the second source gas. Alternatively, the first source gas may be exhausted by vacuum evacuation instead of the introduction of the inert gas, and then the second source gas may be introduced. The first source gas is adsorbed on a surface of the substrate to form a first single-atomic layer and then, the second source gas is introduced to react with the first single-atomic layer; as a result, a second single-atomic layer is stacked over the first single-atomic layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction. For this reason, an ALD method makes it possible to accurately adjust a thickness and thus is suitable for manufacturing a minute FET.

The conductive film and the semiconductor film that are described in the above embodiment can be formed by a thermal CVD method such as a MOCVD method or an ALD method. For example, in the case where an $InGaZnO_X$ (X>0) film is formed, trimethylindium, trimethylgallium, and diethylzinc are used. Note that the chemical formula of trimethylindium is $(CH_3)_3In$. The chemical formula of diethylzinc is $(C_2H_5)_2Zn$. Without limitation to the above combination, triethylgallium (chemical formula: $(C_2H_5)_3Ga$) can be used instead of trimethylgallium and dimethylzinc (chemical formula: $(CH_3)_2Zn$) can be used instead of diethylzinc.

In the case where a tungsten film is formed using a deposition apparatus employing ALD, for example, a $WF_6$ gas and a $B_2H_6$ gas are sequentially introduced plural times to form an initial tungsten film, and then a $WF_6$ gas and an $H_2$ gas are introduced at a time, so that the tungsten film is formed. Note that an $SiH_4$ gas may be used instead of a $B_2H_6$ gas.

In the case where an oxide semiconductor film, e.g., an $InGaZnO_X$ (X>0) film is formed using a deposition apparatus employing ALD, for example, an $(CH_3)_3In$ gas and an $O_3$ gas are sequentially introduced plural times to form an InO$_2$ layer, a Ga(CH$_3$)$_3$ gas and an O$_3$ gas are introduced at a time to form a GaO layer, and then a Zn(CH$_3$)$_2$ gas and an O$_3$ gas are introduced at a time to form a ZnO layer. Note that the order of these layers is not limited to this example. A mixed compound layer such as an InGaO$_2$ layer, an InZnO$_2$ layer, a GaInO layer, a ZnInO layer, or a GaZnO layer may be formed by mixing of these gases. Although an H$_2$O gas which is obtained by bubbling with an inert gas such as an Ar gas may be used instead of an O$_3$ gas, it is preferable to use an O$_3$ gas, which does not contain H. Instead of an (CH$_3$)$_3$In gas, an In(C$_2$H$_5$)$_3$ gas may be used. Instead of a Ga(CH$_3$)$_3$ gas, a (C$_2$H$_5$)$_3$Ga gas may be used. Furthermore, a (CH$_3$)$_2$Zn gas may be used.

<Liquid Crystal Layer and Terminal Portion>

The substrate 202 is provided with a spacer (not illustrated) as a component for maintaining a cell gap in the LC panel 21. The spacer is preferably formed with a photosensitive resin material because the photosensitive resin material can be easily processed. It is preferable that after the formation of the electrode COM, the spacer be formed on the electrode COM. The alignment film 262 is formed to cover the spacer. The spacer can be formed on the substrate 201 side. In that case, after the formation of the electrode PIX, the spacer may be formed over the insulating layer 243. The electrode PIX has a region in contact with the spacer in some cases.

For sealing the liquid crystal layer 203, a sealing member (not illustrated) surrounding the pixel portion 31 is formed between the substrates 201 and 202. The backplane (the substrate 201) of the display portion and the backplane (the substrate 201) of the touch sensor are attached with the sealing member, and the liquid crystal layer 203 is sealed between the substrates 201 and 202. In the pixel circuit 35, the liquid crystal element 60 is formed of the electrode PIX, the electrode COM, and the liquid crystal layer 203. Note that FIG. 7 illustrates an example in which the gate driver circuit 32 (the peripheral circuit 34) and the output circuit 43 overlap with the liquid crystal layer 203; however, a structure in which the gate driver circuit 32 and the like do not overlap with the liquid crystal layer 203 may be formed by forming the sealing member to overlap partly or entirely with the peripheral circuit 34 and the peripheral circuit 44.

A terminal portion 37 and a terminal portion 47 are formed outside the sealing member. The terminals 224 are formed in the terminal portion 37. The terminals 224 are electrically connected to an FPC 206 through an anisotropic conductive layer 204. The terminals 285 are formed in the terminal portion 47. The terminals 285 are electrically connected to an FPC 207 through an anisotropic conductive layer 205.

The LC panel 21 illustrated in FIG. 7 includes a touch sensor. One electrode of the capacitor CS1 and one electrode of the liquid crystal element 60 are formed of the common conductive film (the electrode COM). With this device structure, an increase in the thickness of the LC panel 21 can be suppressed even when a touch sensor is included in the LC panel 21. The substrate 202 that supports the backplane of the touch sensor is a counter substrate of the LC panel 21. This means that a support substrate for a touch panel does not need to be added to the LC panel 21, so that an increase in weight can also be suppressed. Therefore, this embodiment can reduce the thickness and weight of an LCD including a touch sensor.

Embodiment 2

In this embodiment, an OS transistor is described.

A semiconductor region in the OS transistor is formed with an oxide semiconductor. Examples of the oxide semiconductor include indium oxide, tin oxide, zinc oxide, an In—Zn oxide, a Sn—Zn oxide, an Al—Zn oxide, a Zn—Mg oxide, a Sn—Mg oxide, an In—Mg oxide, an In—Ga oxide, an In—Ga—Zn oxide (also referred to as IGZO), an In—Al—Zn oxide, an In—Sn—Zn oxide, a Sn—Ga—Zn oxide, an Al—Ga—Zn oxide, a Sn—Al—Zn oxide, an In—Hf—Zn oxide, an In—Zr—Zn oxide, an In—Ti—Zn oxide, an In—Sc—Zn oxide, an In—Y—Zn oxide, an In—La—Zn oxide, an In—Ce—Zn oxide, an In—Pr—Zn oxide, an In—Nd—Zn oxide, an In—Sm—Zn oxide, an In—Eu—Zn oxide, an In—Gd—Zn oxide, an In—Tb—Zn oxide, an In—Dy—Zn oxide, an In—Ho—Zn oxide, an In—Er—Zn oxide, an In—Tm—Zn oxide, an In—Yb—Zn oxide, an In—Lu—Zn oxide, an In—Sn—Ga—Zn oxide, an In—Hf—Ga—Zn oxide, an In—Al—Ga—Zn oxide, an In—Sn—Al—Zn oxide, an In—Sn—Hf—Zn oxide, and an In—Hf—Al—Zn oxide. Note that the In—Ga—Zn oxide is, for example, an oxide whose main components are In, Ga, and Zn, and there is no particular limitation on the ratio of In to Ga and Zn. The In—Ga—Zn oxide may contain another metal element in addition to In, Ga, and Zn.

An OS transistor preferably includes an oxide semiconductor containing at least indium (In) or zinc (Zn). The oxide semiconductor also preferably contains an element serving as a stabilizer for reducing a variation in electrical characteristics. Examples of such an element include Ga, Sn, Hf, Al, and Zr. Typical examples of the oxide semiconductor used for the OS transistor include an In—Ga—Zn oxide and an In—Sn—Zn oxide. Alternatively, a material represented by InMO$_3$(ZnO)$_n$ (m>0) may be used as an oxide semiconductor. Note that M represents one or more metal elements selected from Ga, Fe, Mn, and Co, or the above element as a stabilizer. Still alternatively, a material represented by In$_2$SnO$_5$(ZnO)$_n$ (n>0) may be used as the oxide semiconductor. For example, an In—Ga—Zn oxide in which an atomic ratio of In to Ga and Zn is 1:1:1, 1:3:2, 3:1:2, or 2:1:3, or an oxide whose composition is in the neighborhood of the above compositions may be used.

<<Oxide Semiconductor>>

The structure of an oxide semiconductor is described below.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°. In this specification, trigonal and rhombohedral crystal systems are included in a hexagonal crystal system.

Oxide semiconductors are classified roughly into a single-crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a microcrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

It is known that an amorphous structure is generally defined as being metastable and unfixed, and being isotropic and having no non-uniform structure. In other words, an amorphous structure has a flexible bond angle and a short-range order but does not have a long-range order.

This means that an inherently stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. Note that an a-like OS has a periodic structure in a microscopic region, but at the same time has a void and has an unstable structure. For this reason, an a-like OS has physical properties similar to those of an amorphous oxide semiconductor.

<CAAC-OS>

A CAAC-OS is one of oxide semiconductors having a plurality of c-axis aligned crystal parts (also referred to as pellets).

When a combined analysis image (also referred to as a high-resolution TEM image) of a bright-field image and a diffraction pattern of the CAAC-OS is observed by a transmission electron microscope (TEM), a plurality of crystal parts are seen. However, a boundary between crystal parts, that is, a grain boundary is not clearly observed even in the high-resolution TEM image. Thus, in the CAAC-OS, a reduction in electron mobility due to the crystal grain boundary is less likely to occur.

The high-resolution cross-sectional TEM image of the CAAC-OS revealed that the size of one crystal part is 1 nm or greater or 3 nm or greater, and the size of a space caused by tilt of crystal parts is approximately 0.8 nm. Therefore, the crystal part of the CAAC-OS can be referred to as a nanocrystal (nc). The CAAC-OS can be referred to as an oxide semiconductor including c-axis aligned nanocrystals (CANC).

In the high-resolution cross-sectional TEM image of the CAAC-OS observed in a direction substantially parallel to the sample surface, metal atoms are arranged in a layered manner in the crystal parts. Each metal atom layer has a morphology reflecting a surface over which the CAAC-OS is formed (hereinafter, a surface over which the CAAC-OS is formed is referred to as a formation surface) or a top surface of the CAAC-OS, and is arranged parallel to the formation surface or the top surface of the CAAC-OS. In the high-resolution planar TEM image of the CAAC-OS observed in a direction substantially perpendicular to the sample surface, metal atoms arranged in a triangular or hexagonal configuration are seen in the crystal parts. However, there is no regularity in arrangement of metal atoms between different crystal parts.

A CAAC-OS is subjected to structural analysis with an X-ray diffraction (XRD) apparatus. For example, when the CAAC-OS including an $InGaZnO_4$ crystal is analyzed by an out-of-plane method, a peak appears when the diffraction angle ($2\theta$) is around 31°. Since this peak is derived from the (009) plane of the $InGaZnO_4$ crystal, it can also be confirmed that crystals in the CAAC-OS have c-axis alignment and that the c-axes are aligned in a direction substantially perpendicular to the formation surface or the top surface of the CAAC-OS.

Note that when the CAAC-OS including an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal part having no c-axis alignment is included in part of the CAAC-OS. It is preferable that in the CAAC-OS, a peak of $2\theta$ appear at around 31° and a peak of $2\theta$ not appear at around 36°.

As described above, the CAAC-OS is an oxide semiconductor with high crystallinity. Entry of impurities, formation of defects, or the like might decrease the crystallinity of an oxide semiconductor. This means that the CAAC-OS is an oxide semiconductor having a low impurity concentration. The impurity is an element other than the main components of the oxide semiconductor, such as hydrogen, carbon, silicon, or a transition metal element. In particular, an element that has higher bonding strength to oxygen than a metal element included in the oxide semiconductor, such as silicon, disturbs the atomic arrangement of the oxide semiconductor by depriving the oxide semiconductor of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor and causes a decrease in crystallinity.

The characteristics of an oxide semiconductor having impurities or defects might be changed by light, heat, or the like. For example, the impurity contained in the oxide semiconductor might serve as a carrier trap or a carrier generation source. Furthermore, oxygen vacancies in the oxide semiconductor serve as carrier traps or s carrier generation sources when hydrogen is captured therein.

The CAAC-OS is an oxide semiconductor having a low density of defect states. In some cases, oxygen vacancies in the oxide semiconductor serve as carrier traps or carrier generation sources when hydrogen is captured therein. An oxide semiconductor with a low impurity concentration and a low density of defect states (a small number of oxygen vacancies) is referred to as a "highly purified intrinsic" or "substantially highly purified intrinsic" oxide semiconductor. The CAAC-OS has a low impurity concentration and a low density of defect states. Thus, the CAAC-OS can be referred to as an oxide semiconductor having stable characteristics.

A highly purified intrinsic or substantially highly purified intrinsic oxide semiconductor has few carrier generation sources, and thus has a low carrier density in some cases. Thus, a transistor including the oxide semiconductor rarely has a negative threshold voltage (is rarely normally on). The highly purified intrinsic or substantially highly purified intrinsic oxide semiconductor has few carrier traps. Accordingly, the transistor including the oxide semiconductor has little variation in electrical characteristics and high reliability. Charges trapped by the carrier traps in the oxide semiconductor take a long time to be released. The trapped charges may behave like fixed electric charges. Thus, the transistor which includes the oxide semiconductor having high impurity concentration and a high density of defect states has unstable electrical characteristics in some cases.

With the use of the CAAC-OS in a transistor, variation in the electrical characteristics of the transistor due to irradiation with visible light or ultraviolet light is small.

<Microcrystalline Oxide Semiconductor, nc-OS>

A microcrystalline oxide semiconductor and an nc-OS have a region in which a crystal part is observed and a region in which a crystal part is not clearly observed in a high-resolution TEM image. In most cases, the size of a crystal part included in the nc-OS is greater than or equal to 1 nm and less than or equal to 10 nm, or greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. Note that there is a possibility that the origin of the nanocrystal is the same as that of a pellet in a CAAC-OS. Therefore, a crystal part of the nc-OS may be referred to as a pellet in the following description.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic order. Furthermore, there is no regularity of crystal orientation between different crystal parts in the nc-OS; thus, the orientation of the whole film of the nc-OS is not observed. Accordingly, in some cases, the nc-OS cannot be distinguished from an amorphous oxide semiconductor depending on an analysis method. For example, when the nc-OS is subjected to structural analysis by an out-of-plane method with an XRD apparatus using an X-ray having a diameter larger than the diameter of a crystal part, a peak which shows a crystal plane does not appear. Furthermore, a halo pattern is shown in an electron diffraction pattern (also referred to as a selected area electron diffraction pattern) of the nc-OS obtained by using an electron beam having a probe diameter (e.g., larger than or equal to 50 nm) larger than the diameter of a crystal part. Meanwhile, spots are shown in a nanobeam electron diffraction pattern of the nc-OS obtained by using an electron beam having a probe diameter close to, or smaller than the diameter of a crystal part. Furthermore, in a nanobeam electron diffraction pattern of the nc-OS, regions with high luminance in a circular (ring) pattern are shown in some cases. Also in a nanobeam electron diffraction pattern of the nc-OS, a plurality of spots are shown in a ring-like region in some cases.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor having more regularity than an amorphous oxide semiconductor. Therefore, the nc-OS has a lower density of defect states than an amorphous oxide semiconductor. However, there is no regularity of crystal orientation between different crystal parts in the nc-OS. Therefore, the nc-OS has a higher density of defect states than the CAAC-OS.

<Amorphous Oxide Semiconductor, a-like OS>

The amorphous oxide semiconductor has disordered atomic arrangement and no crystal part. For example, the amorphous oxide semiconductor does not have a specific state as in quartz. In the high-resolution TEM image of the amorphous oxide semiconductor, crystal parts cannot be found.

When the amorphous oxide semiconductor is subjected to structural analysis by an out-of-plane method with an XRD apparatus, a peak showing a crystal plane does not appear. A halo pattern is shown in an electron diffraction pattern of the amorphous oxide semiconductor. Furthermore, a halo pattern is shown but a spot is not shown in a nanobeam electron diffraction pattern of the amorphous oxide semiconductor.

An a-like OS has a structure intermediate between those of the nc-OS and the amorphous oxide semiconductor. In a high-resolution TEM image of the a-like OS, a void may be observed. Furthermore, in the high-resolution TEM image, there are a region where a crystal part is clearly observed and a region where a crystal part is not observed. In the a-like OS, crystallization by a slight amount of electron beam used for TEM observation occurs and growth of the crystal part is found sometimes. In contrast, crystallization by a slight amount of electron beam used for TEM observation is less observed in the nc-OS having good quality.

Note that the crystal part size in the a-like OS and the nc-OS can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers of three In—O layers and six Ga—Zn—O layers are layered in the c-axis direction. Thus, the distance between the adjacent layers is equivalent to the lattice spacing on the (009) plane (also referred to as d value). The value is calculated to be 0.29 nm from crystal structural analysis. Thus, each of the lattice fringes having a distance therebetween of from 0.28 nm to 0.30 nm corresponds to the a-b plane of the $InGaZnO_4$ crystal, focusing on the lattice fringes in the high-resolution TEM image.

A semiconductor region in the OS transistor may be formed with a single crystal oxide semiconductor or a non-single-crystal oxide semiconductor. The semiconductor region in the OS transistor may be formed of a single oxide semiconductor film or stacked films including two or more of an amorphous oxide semiconductor film, an a-like OS film, an nc-OS film, a microcrystalline oxide semiconductor film, and a CAAC-OS film, for example With the use of the CAAC-OS in a transistor, variation in the electrical characteristics of the OS transistor due to irradiation with visible light or ultraviolet light is small. Thus, the OS transistor has high reliability.

For example, a CAAC-OS film is deposited by a sputtering method using a polycrystalline metal oxide target. When ions collide with the target, a crystal region included in the target might be separated from the target along the a-b plane, and a sputtered particle having a plane parallel to the a-b plane (flat-plate-like or pellet-like sputtered particle) might be separated from the target. In that case, the flat-plate-like or pellet-like sputtered particle reaches a substrate while maintaining its crystal state, so that the CAAC-OS film can be deposited. For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a treatment chamber may be reduced. The concentration of impurities in a deposition gas may also be reduced. Specifically, a deposition gas whose dew point is −80° C. or lower, preferably −100° C. or lower is used.

By increasing the substrate heating temperature during the deposition, when the flat-plate-like or pellet-like sputtered particle reaches the substrate, migration occurs on the substrate surface, so that a flat plane of the sputtered particle is attached to the substrate. For example, the substrate heating temperature during the deposition may be higher than or equal to 100° C. and lower than or equal to 740° C., preferably higher than or equal to 200° C. and lower than or equal to 500° C.

Furthermore, it is preferable to reduce plasma damage during the deposition by increasing the proportion of oxygen in the deposition gas and optimizing power. The proportion of oxygen in the deposition gas is higher than or equal to 30 vol %, preferably 100 vol %.

Embodiment 3

In this embodiment, an electronic device that includes an LCD for its display portion is described. With the use of the LCD of Embodiment 1, an electronic device on which operation and input can be performed by touching its screen can be provided.

<<Configuration Example of Information Processing System>>

Figure 9:
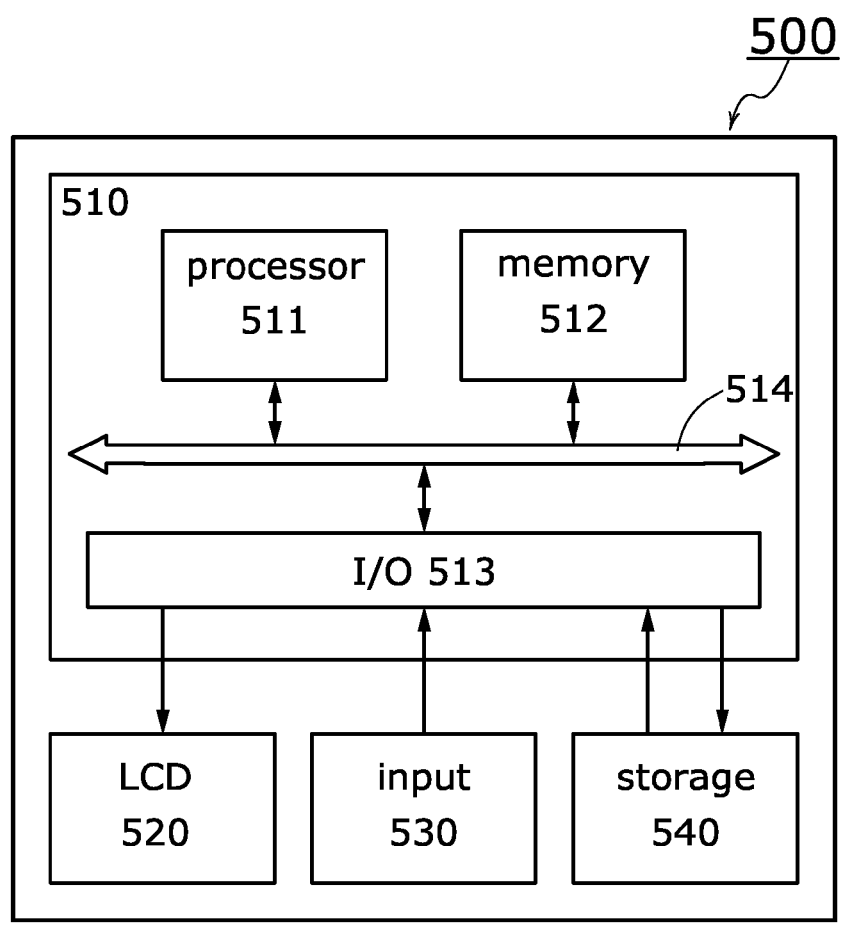
FIG. 9 is a block diagram illustrating a configuration example of an information processing system.

FIG. 9 is a block diagram illustrating a configuration example of an information processing system that includes an LCD for its display portion. An information processing system 500 includes an arithmetic unit 510, an LCD 520, an input unit 530, and a storage unit 540.

The arithmetic unit 510 has a function of controlling the whole information processing system 500. The arithmetic unit 510 includes a processor 511, a memory unit 512, an input/output (I/O) interface 513, and a bus 514. Via the bus 514, the processor 511, the memory unit 512, and the I/O interface 513 are connected to one another. The arithmetic unit 510 communicates with the LCD 520, the input unit 530, and the storage unit 540 via the I/O interface 513. For example, an input signal from the input unit 530 is transferred to the processor 511 or the memory unit 512 via the I/O interface 513 and the bus 514.

Data (including programs) that is necessary for processing of the processor 511 and data that is input via the I/O interface 513 are retained in the memory unit 512. The processor 511 executes a program to operate the information processing system 500. The processor 511 performs some processing such as analyzing an input signal from the input unit 530, reading data from the storage unit 540, writing data to the memory unit 512 and the storage unit 540, or generating a signal output to the LCD 520.

The LCD 520 is provided as an output unit and constitutes a display portion of the information processing system 500. The information processing system 500 may include another output unit such as a speaker or a printer in addition to the display unit.

The input unit 530 is a device for inputting data to the arithmetic unit 510. A user can operate the information processing system 500 by operating the input unit 530. Various human interface devices can be used as the input unit 530, and the information processing system 500 may include a plurality of input units. The input unit 530 includes at least a touch sensor. The touch sensor is included in the LC panel of the LCD 520. In addition to the touch sensor, a keyboard, a mouse, and an operation button are given as examples of the input unit 530. The user directly operates the input unit 530 to operate the information processing system 500. The information processing system 500 may be operated with another input unit including a device that senses sound, eye movement, gesture, or the like. For example, a microphone (an audio input/output device) or a camera (an imaging system) may be provided as the input unit 530.

Various data such as programs or image signals are retained in the storage unit 540. The capacitance of the storage unit 540 is larger than that of the memory unit 512. Examples of the storage unit 540 include a flash memory, a DRAM, and a hard disc drive (HDD). The storage unit 540 may be provided as necessary.

The information processing system 500 may be a device in which all the units such as the arithmetic unit 510 are incorporated in a housing or a device in which some units are connected to the arithmetic unit 510 via wires or wirelessly. Examples of the former device include a laptop personal computer (PC), a tablet PC, an e-book reader, and a smartphone. Examples of the latter device include a set of a desk-top PC, a keyboard, a mouse, and a monitor.

The LCD 520 in the information processing system 500 may be configured to perform display in the normal driving and the IDS driving. Examples of preferable uses of the information processing system 500 that performs still image display in the IDS driving are reading an electronic book and seeing photographs taken by a digital camera. In other words, in the case of using the information processing system 500 under the conditions where the same image is displayed for a relatively long period and display of the whole screen is changed by users' operation, a still image is preferably displayed in the IDS driving. In the case of displaying in the IDS driving, for example, display on the screen may be switched in accordance with detection results of the touch sensor in the LCD 520.

FIGS. 10A to 10F illustrate some specific examples of the information processing system 500. FIGS. 10A to 10F are external views illustrating examples of electronic devices whose display portion includes an LCD including a touch sensor.

Figure 10A:
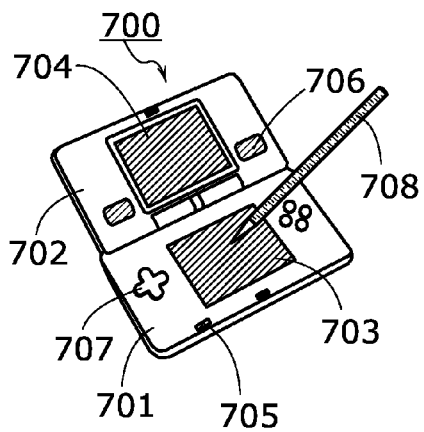
FIGS. 10A to 10F are external views each illustrating an example of an electronic device.

A portable game machine 700 illustrated in FIG. 10A includes a housing 701, a housing 702, a display portion 703, a display portion 704, a microphone 705, speakers 706, a control key 707, and the like. The LCD including a touch sensor described in Embodiment 1 is used in one or both of the display portions 703 and 704. The touch operation can be performed on the display portion 703 or the display portion 704 with a stylus 708, a finger, or the like.

Figure 10B:
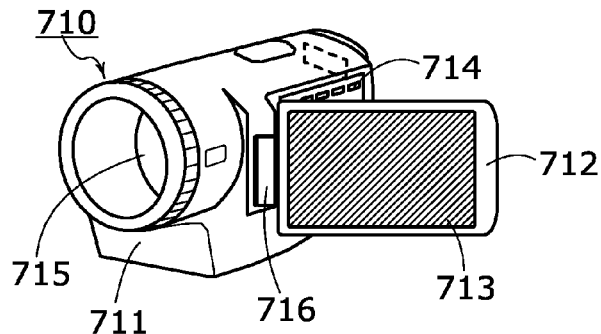

A video camera 710 illustrated in FIG. 10B includes a housing 711, a housing 712, a display portion 713, operation buttons 714, a lens 715, a joint 716, and the like. The operation buttons 714 and the lens 715 are provided in the housing 711, and the display portion 713 is provided in the housing 712. The housings 711 and 712 are connected to each other with the joint 716, and the angle between the housings 711 and 712 can be changed with the joint 716. An image on the display portion 713 may be switched depending on the angle between the housings 711 and 712 at the joint 716. The LCD including a touch sensor described in Embodiment 1 is used in the display portion 713.

Figure 10C:
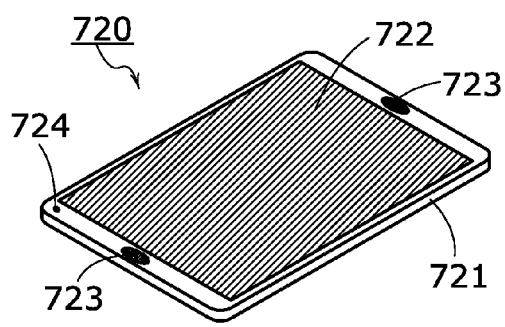

An information terminal 720 illustrated in FIG. 10C is a tablet terminal, and includes a display portion 722 incorporated in a housing 721, an operation button 723, and a speaker 724. In addition, although not illustrated, the information terminal 720 includes a microphone, a stereo headphone jack, a memory card insertion slot, a camera, an external connection port such as a USB connector, and the like. The LCD including a touch sensor described in Embodiment 1 is used in the display portion 722.

Figure 10D:
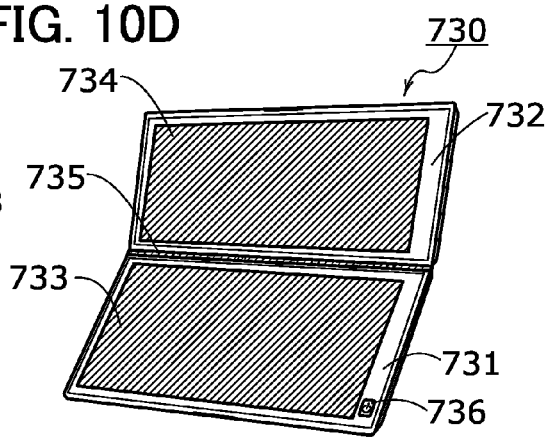

An information terminal 730 illustrated in FIG. 10D is a foldable tablet terminal, and includes a housing 731, a housing 732, a display portion 733, a display portion 734, a connection portion 735, an operation button 736, and the like. The LCD including a touch sensor described in Embodiment 1 is used in each of the display portions 733 and 734.

Figure 10E:
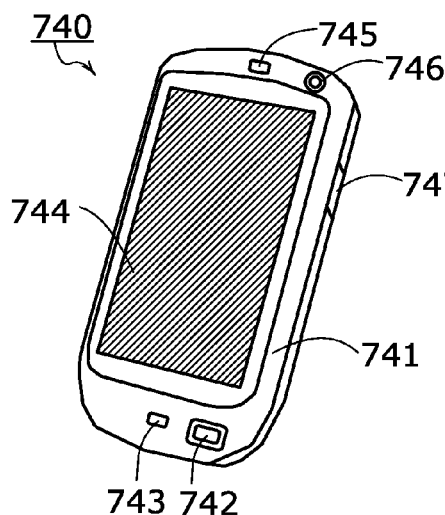

A smartphone 740 illustrated in FIG. 10E includes a housing 741, an operation button 742, a microphone 743, a display portion 744, a speaker 745, a camera lens 746, and the like. The housing 741 includes a camera. Since the camera lens 746 is provided on the same plane where the display portion 744 is provided, videophone is possible. The LCD including a touch sensor described in Embodiment 1 is used in the display portion 744.

Figure 10F:
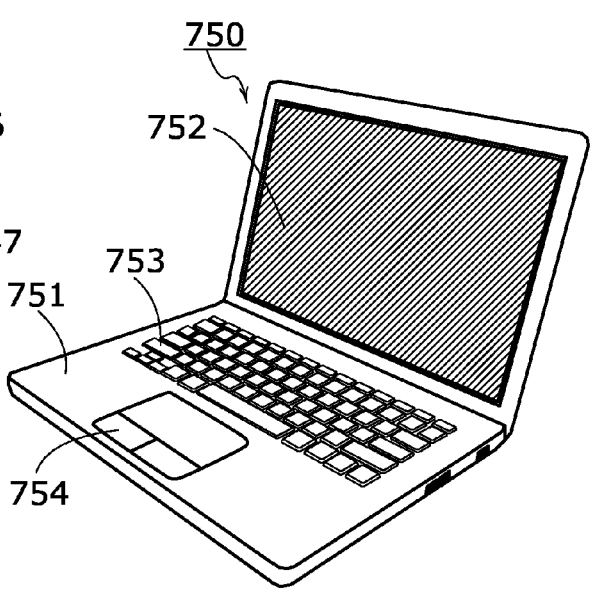

A laptop personal computer 750 illustrated in FIG. 10F includes a housing 751, a display portion 752, a keyboard 753, a pointing device 754, and the like. The LCD including a touch sensor described in Embodiment 1 is used in the display portion 752.

This application is based on Japanese Patent Application serial no. 2014-088324 filed with Japan Patent Office on Apr. 22, 2014, the entire contents of which are hereby incorporated by reference.

What is claimed is:

1. A liquid crystal display device comprising:
a first substrate provided with a pixel electrode;
a second substrate provided with a sensor circuit;
the sensor circuit comprising a transistor and a capacitor; and
a pixel circuit comprising a liquid crystal element;
wherein the capacitor comprises a first electrode, a second electrode, and an insulating layer,
wherein the liquid crystal element comprises the first electrode, the pixel electrode, and a liquid crystal layer,
wherein the first substrate and the second substrate face each other,
wherein the first electrode and the pixel electrode overlap with each other with the liquid crystal layer interposed between the pixel electrode and the first electrode,
wherein the second electrode and the pixel electrode overlap with each other with the insulating layer interposed between the second electrode and the pixel electrode,
wherein a gate of the transistor is electrically connected to the second electrode, and
wherein the transistor is configured to generate a signal corresponding to a potential of the second electrode.

2. The liquid crystal display device according to claim 1, wherein the first substrate and the second substrate are flexible substrates.

3. An electronic device comprising the liquid crystal display device according to claim 1.

4. An electronic device comprising:
the liquid crystal display device according to claim 1; and
at least one of a microphone, a speaker, and a camera.

5. A liquid crystal display device comprising:
a first substrate;
a pixel circuit comprising a liquid crystal element comprising:
a pixel electrode over the first substrate;
a liquid crystal layer over the pixel electrode; and
a first electrode over the liquid crystal layer;
a sensor circuit comprising a transistor and a capacitor, the capacitor comprising:
the first electrode;
an insulating layer over the first electrode; and
a second electrode over the insulating layer; and
a second substrate over the sensor circuit;
wherein the first substrate and the second substrate face each other,
wherein the first electrode and the pixel electrode overlap with each other with the liquid crystal layer interposed between the pixel electrode and the first electrode,
wherein the second electrode and the first electrode overlap with each other with the insulating layer interposed between the second electrode and the first electrode,
wherein a gate of the transistor is electrically connected to the second electrode, and
wherein the transistor is configured to generate a signal corresponding to a potential of the second electrode.

6. The liquid crystal display device according to claim 5, wherein the first substrate and the second substrate are flexible substrates.

7. An electronic device comprising the liquid crystal display device according to claim 5.

8. An electronic device comprising:
the liquid crystal display device according to claim 5; and
at least one of a microphone, a speaker, and a camera.

9. The liquid crystal display device according to claim 1, wherein the first electrode is configured to be supplied with a constant potential.

10. The liquid crystal display device according to claim 5, wherein the first electrode is configured to be supplied with a constant potential.

* * * * *